US010063809B2

(12) United States Patent
Kang et al.

(10) Patent No.: US 10,063,809 B2
(45) Date of Patent: Aug. 28, 2018

(54) INTERFACE FOR A VIDEO CALL

(71) Applicant: Facebook, Inc., Menlo Park, CA (US)

(72) Inventors: Duckjin Kang, Issaquah, WA (US);
Zhengping Zuo, Medina, WA (US);
Stephane Taine, Issaquah, WA (US);
Brendan Benjamin Aronoff, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 15/356,105

(22) Filed: Nov. 18, 2016

(65) Prior Publication Data
US 2018/0146161 A1  May 24, 2018

(51) Int. Cl.
H04N 7/15 (2006.01)
H04N 7/14 (2006.01)
G06F 3/0488 (2013.01)

(52) U.S. Cl.
CPC ........... H04N 7/147 (2013.01); G06F 3/0488 (2013.01); H04N 7/15 (2013.01)

(58) Field of Classification Search
None
See application file for complete search history.

(56) References Cited

U.S. PATENT DOCUMENTS

| 8,451,994 | B2* | 5/2013 | Abuan | H04N 7/147 |
| | | | | 379/102.01 |
| 9,591,218 | B2* | 3/2017 | Ruben | H04N 5/23216 |
| 2002/0093531 | A1 | 7/2002 | Barile | |
| 2005/0254440 | A1 | 11/2005 | Sorrell | |
| 2007/0288959 | A1* | 12/2007 | Istvan | H04N 7/173 |
| | | | | 725/39 |
| 2008/0165245 | A1 | 7/2008 | Sarkar et al. | |
| 2009/0079815 | A1 | 3/2009 | Baird | |
| 2012/0304108 | A1* | 11/2012 | Jarrett | G06F 3/04883 |
| | | | | 715/781 |
| 2013/0169742 | A1* | 7/2013 | Wu | H04N 7/152 |
| | | | | 348/14.08 |
| 2013/0235147 | A1 | 9/2013 | Eshkoli et al. | |
| 2014/0333715 | A1 | 11/2014 | Halavy et al. | |
| 2015/0009279 | A1 | 1/2015 | Vijayakumar et al. | |
| 2015/0201161 | A1 | 7/2015 | Lachapelle et al. | |
| 2015/0244981 | A1 | 8/2015 | Johnson | |
| 2015/0301796 | A1 | 10/2015 | Visser et al. | |

(Continued)

OTHER PUBLICATIONS

Office Action received for U.S. Appl. No. 15/356,071, dated Apr. 14, 2017, 7 pages.

(Continued)

*Primary Examiner* — Creighton Smith

(57) ABSTRACT

Exemplary embodiments relate to techniques for displaying participants in an interface during a group call, and is particularly well-suited to use with small displays. A full-size call interface may be shrunk down into a chathead that makes good use of limited screen real estate, especially when being used on a mobile device. On the smaller chathead, the dominant user is shown, and a roster of users is shrunk and may exhibit reduced functionality. The chathead may be moved around the screen, and other applications may continue to run in the space not occupied by the chathead.

17 Claims, 24 Drawing Sheets

(56) References Cited

U.S. PATENT DOCUMENTS

| | | | |
|---|---|---|---|
| 2016/0062573 A1* | 3/2016 | Dascola | G06F 3/0482 |
| | | | 715/810 |
| 2016/0173823 A1* | 6/2016 | Duckworth | H04N 7/147 |
| | | | 348/14.07 |
| 2016/0219250 A1* | 7/2016 | Bright-Thomas | H04N 7/152 |
| 2016/0306504 A1 | 10/2016 | Brunsch et al. | |
| 2017/0003866 A1* | 1/2017 | Bennett | G06F 3/0484 |
| 2017/0024068 A1* | 1/2017 | Ruben | H04N 5/23216 |
| 2017/0221499 A1 | 8/2017 | Gilg et al. | |

OTHER PUBLICATIONS

Notice of Allowance received for U.S. Appl. No. 15/356,071, dated Mar. 19, 2018, 8 pages.

* cited by examiner

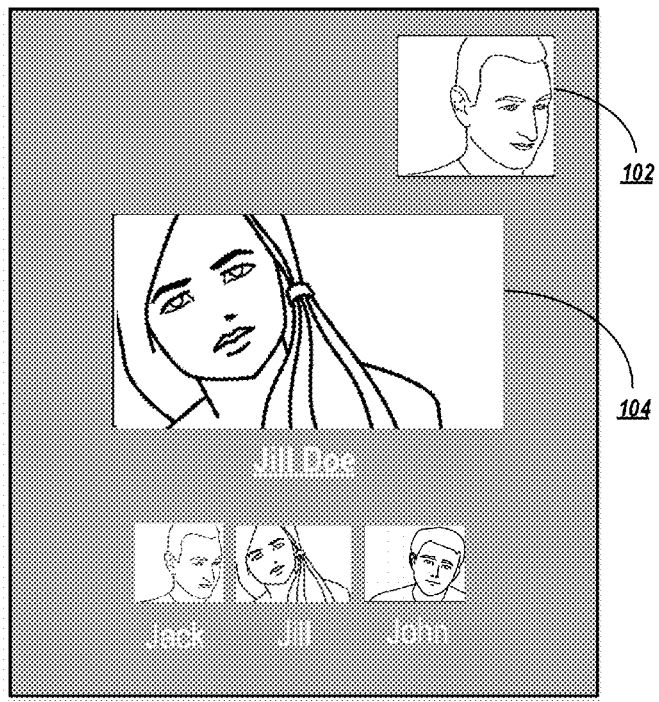
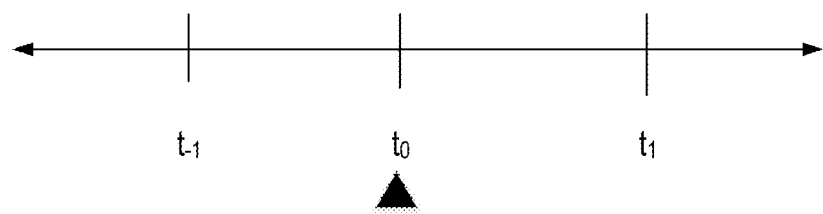
FIG. 1B

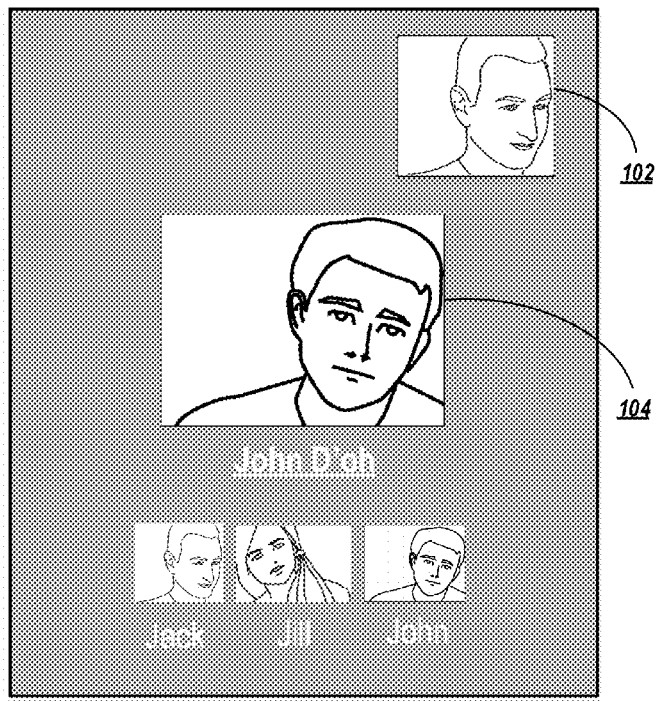
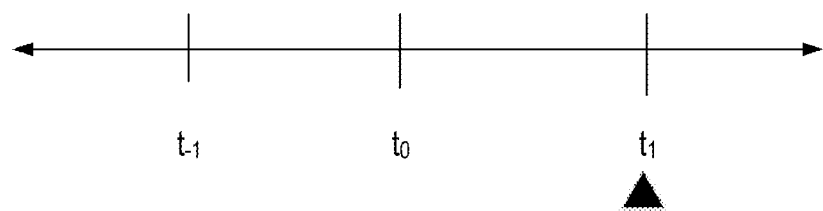
FIG. 1C

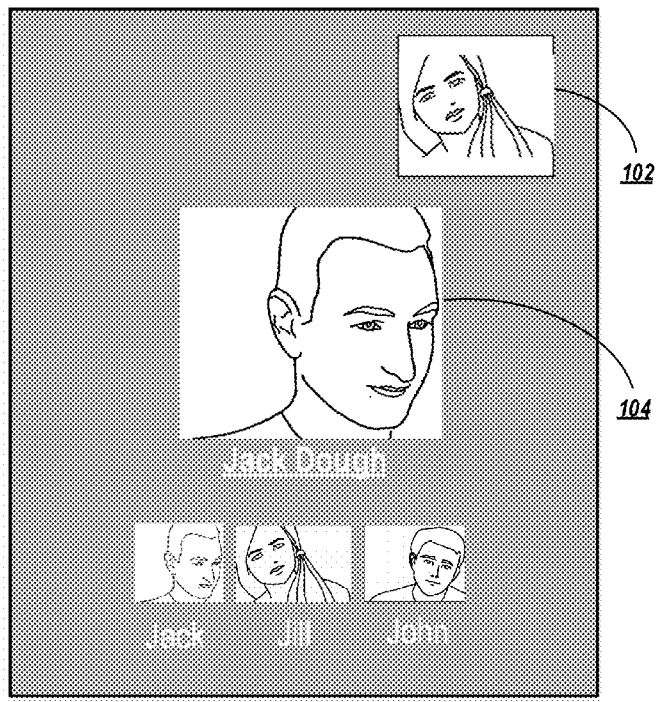
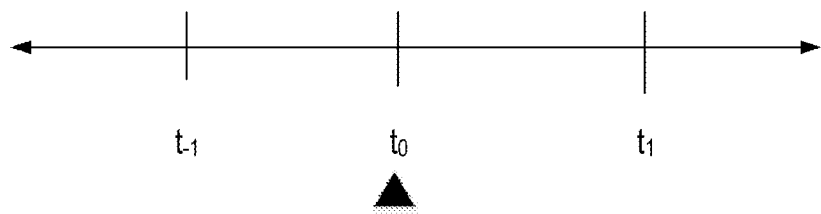
FIG. 1D

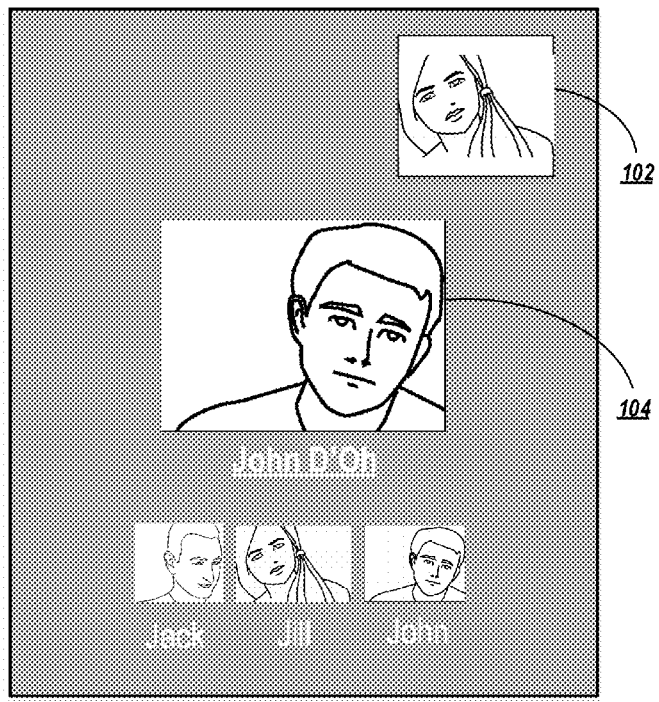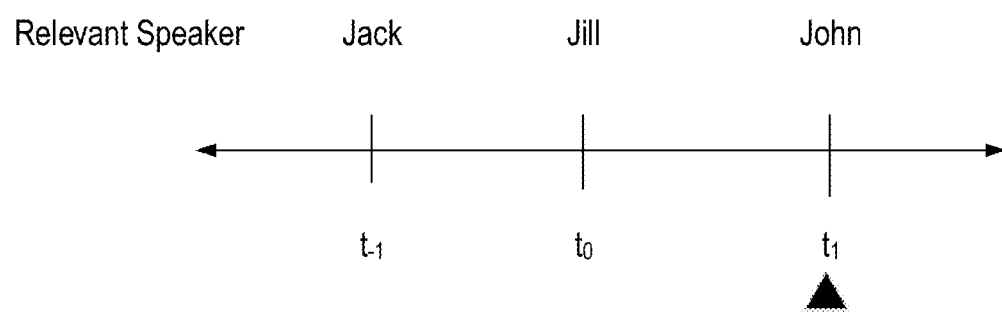
FIG. 1E

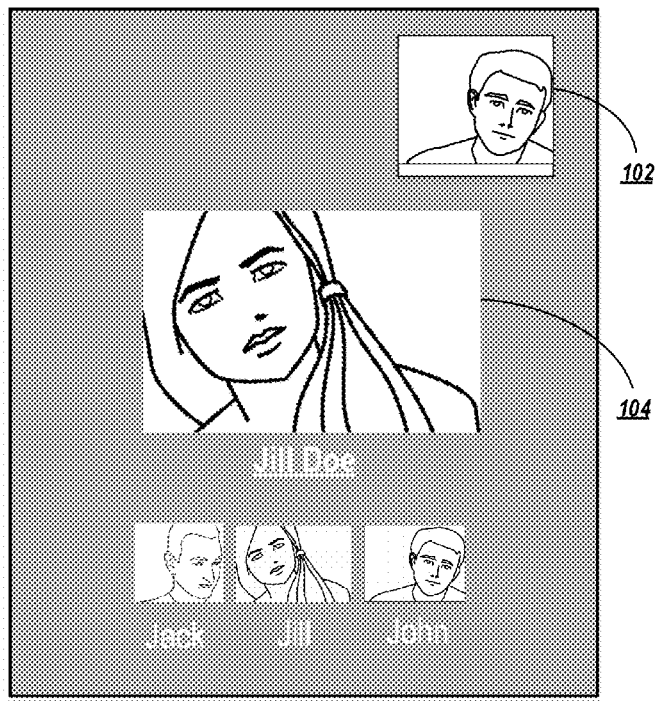
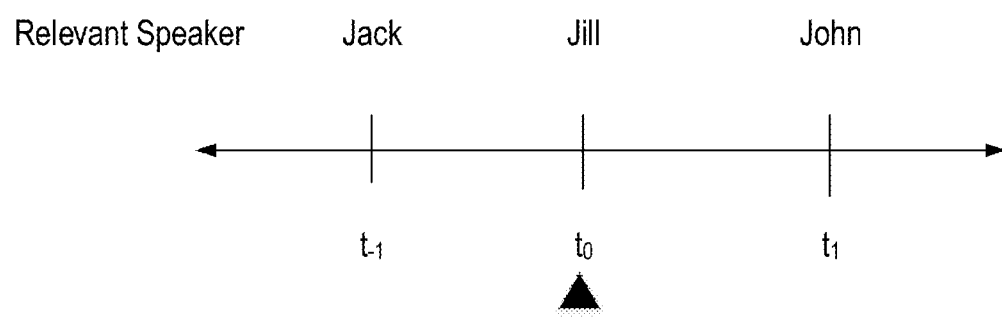
FIG. 1F

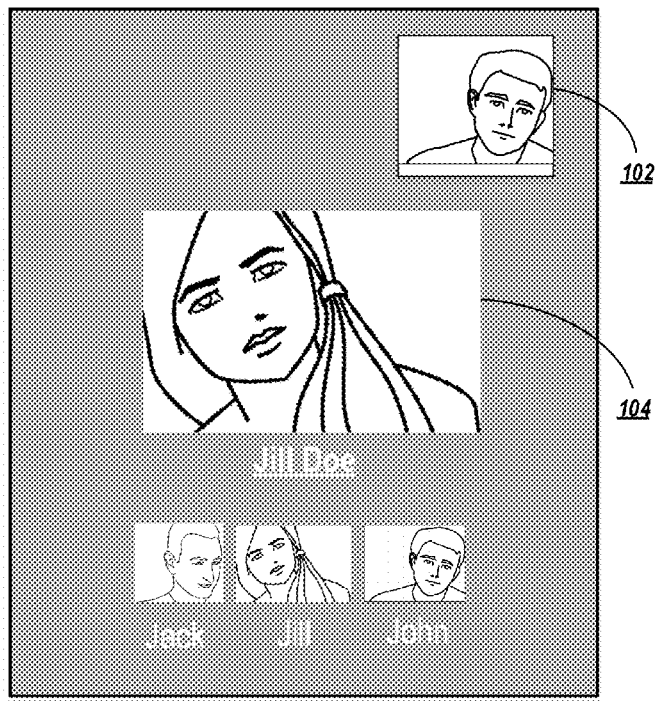
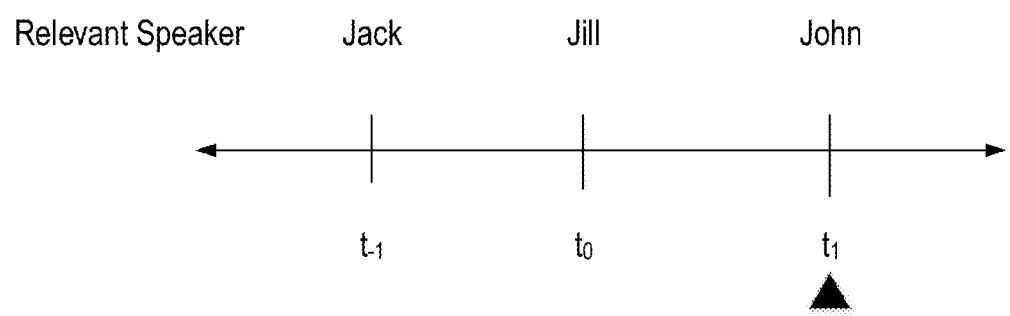
FIG. 1G

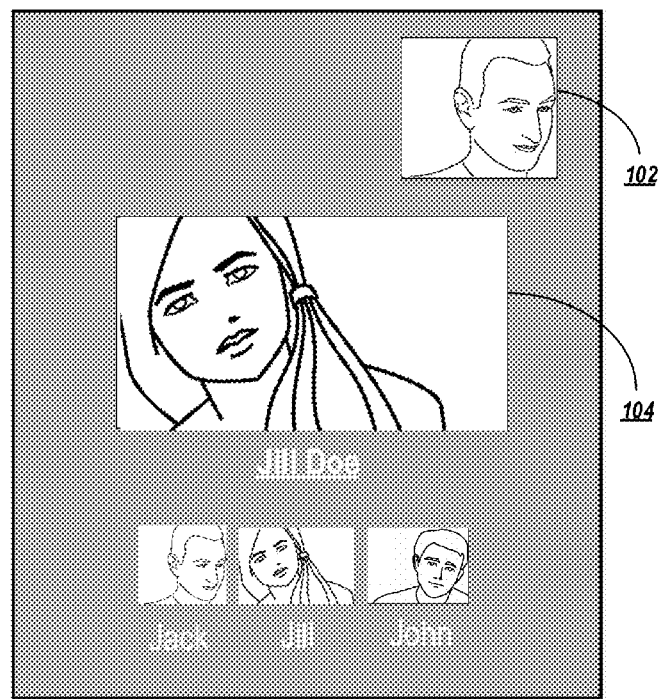
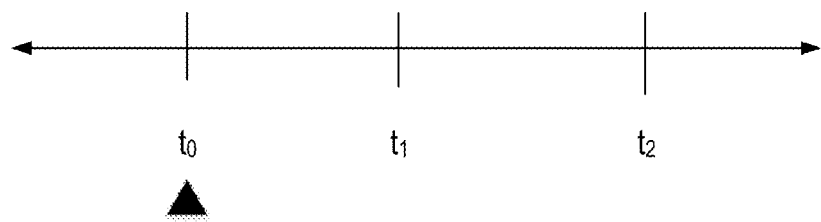
*FIG. 2A*

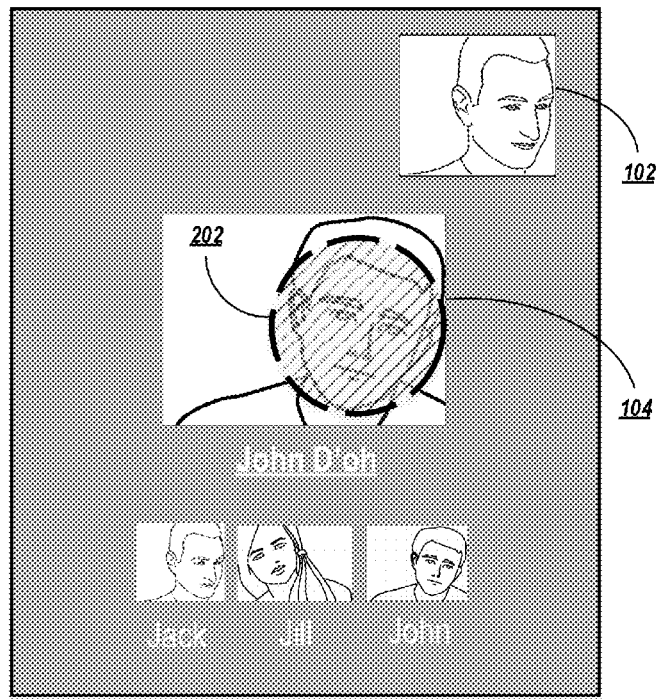
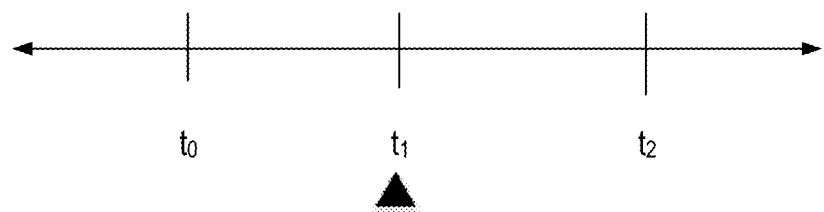
FIG. 2B

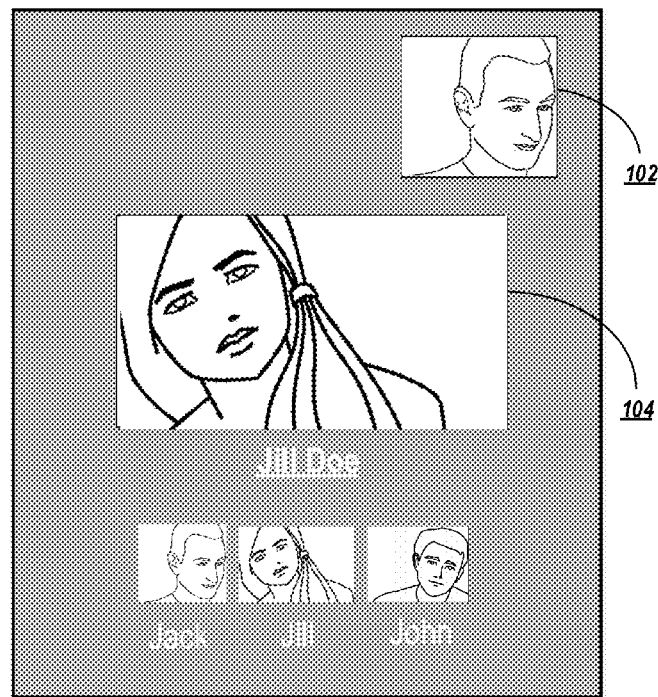
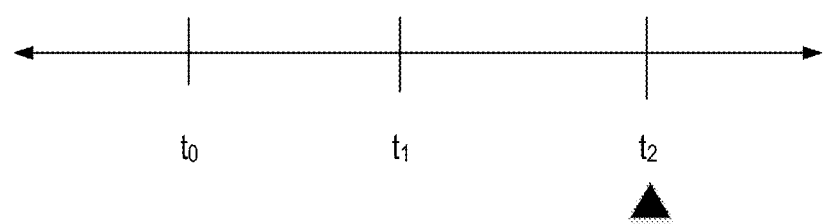
FIG. 2C

Relevant Speaker Logic
400

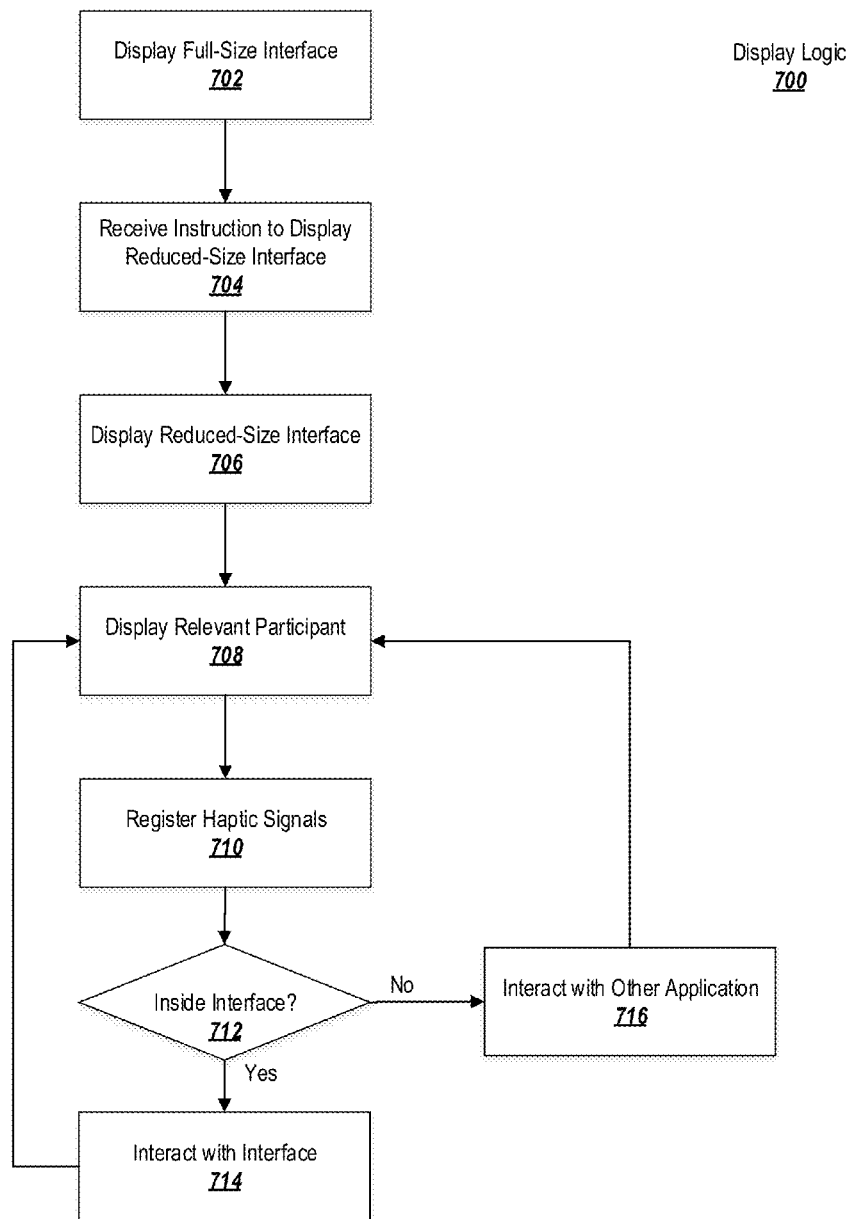

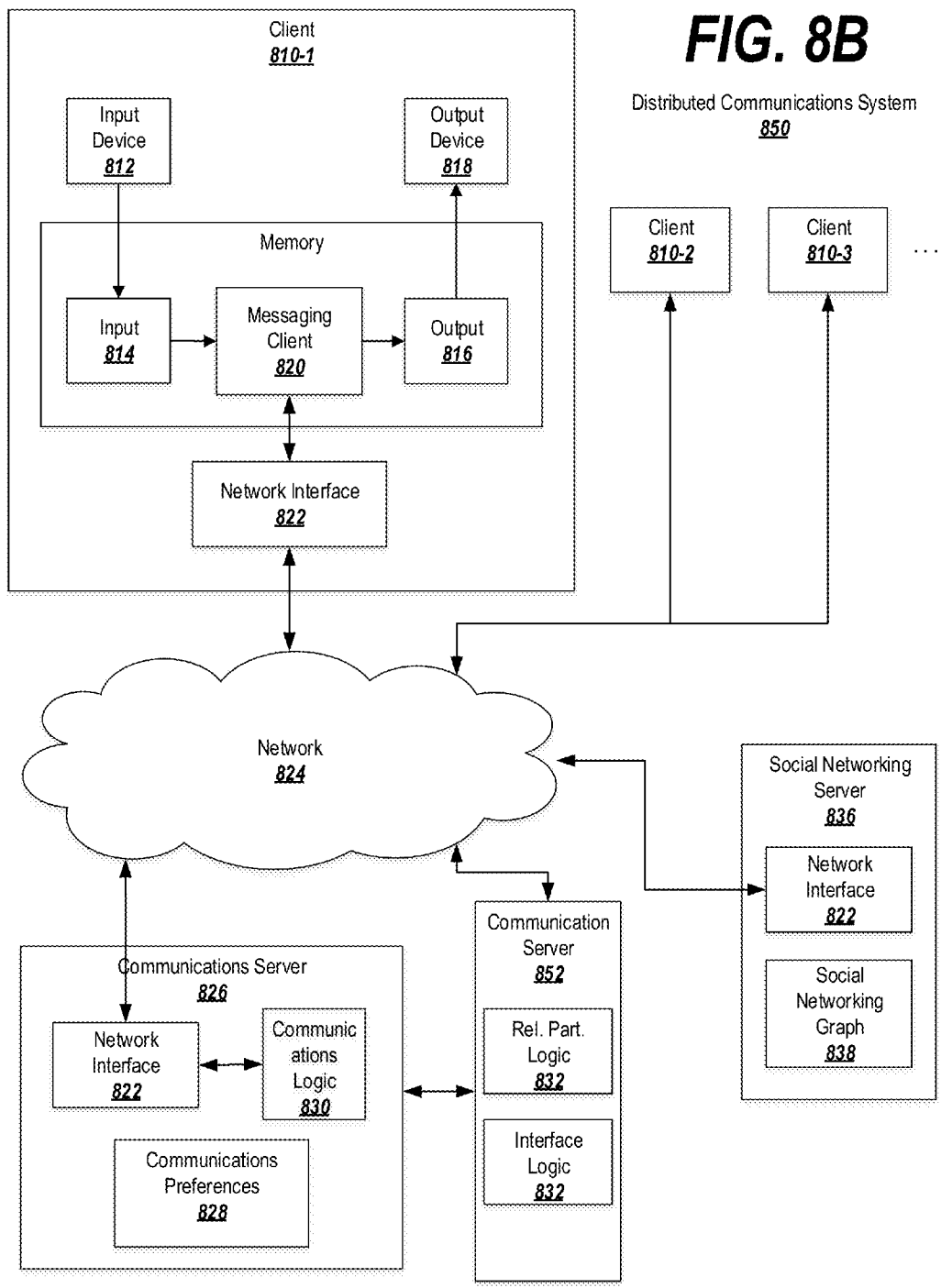

INTERFACE FOR A VIDEO CALL

BACKGROUND

Communications systems allow two or more users to communicate by exchanging text, audio, video, or other forms of communications. For example, communications systems may allow a group of users to participate in a real-time video conversation. As mobile technology has proliferated and improved, communications applications have allowed users to communicate using devices with smaller displays. However, group call interfaces designed for large displays may not translate well to smaller displays.

A second issue relating to communications applications concerns the applications' main displays. Some communications applications attempt to identify the currently-active speaker display that speaker in a prominent portion of the interface. Conventional techniques for selecting and displaying an active speaker, however, often fail to identify the most relevant speaker in a call. As a result, the display of group video calls may appear disjointed, and less like a fluid conversation, to participants.

BRIEF DESCRIPTION OF THE DRAWINGS

FIG. 1B depicts an exemplary interface for displaying a relevant participant from the perspective of another participant.

FIG. 1C depicts an exemplary interface for displaying a new relevant participant from the perspective of another participant.

FIG. 1D depicts an exemplary interface for displaying a relevant participant from the perspective of the relevant participant.

FIG. 1E depicts an exemplary interface for displaying a new relevant participant from the perspective of the previous relevant participant.

FIG. 1F depicts an exemplary interface for displaying a relevant participant from the perspective of the next relevant participant.

FIG. 1G depicts an exemplary interface displayed on the next relevant participant's device after selecting the next relevant participant as the relevant participant.

FIG. 2A depicts an exemplary interface for displaying a first relevant participant selected on the basis of dominance.

FIG. 2B depicts an exemplary interface for displaying a second relevant participant selected on a basis other than dominance.

FIG. 2C depicts an exemplary interface for displaying the first relevant participant after overtaking the second relevant participant according to a relevance metric.

FIG. 7 is a flowchart depicting an exemplary method for displaying a reduced-size communications interface.

FIG. 8B is a block diagram providing an overview of a system including an exemplary distributed communications service;

DETAILED DESCRIPTION

Figure 1A:
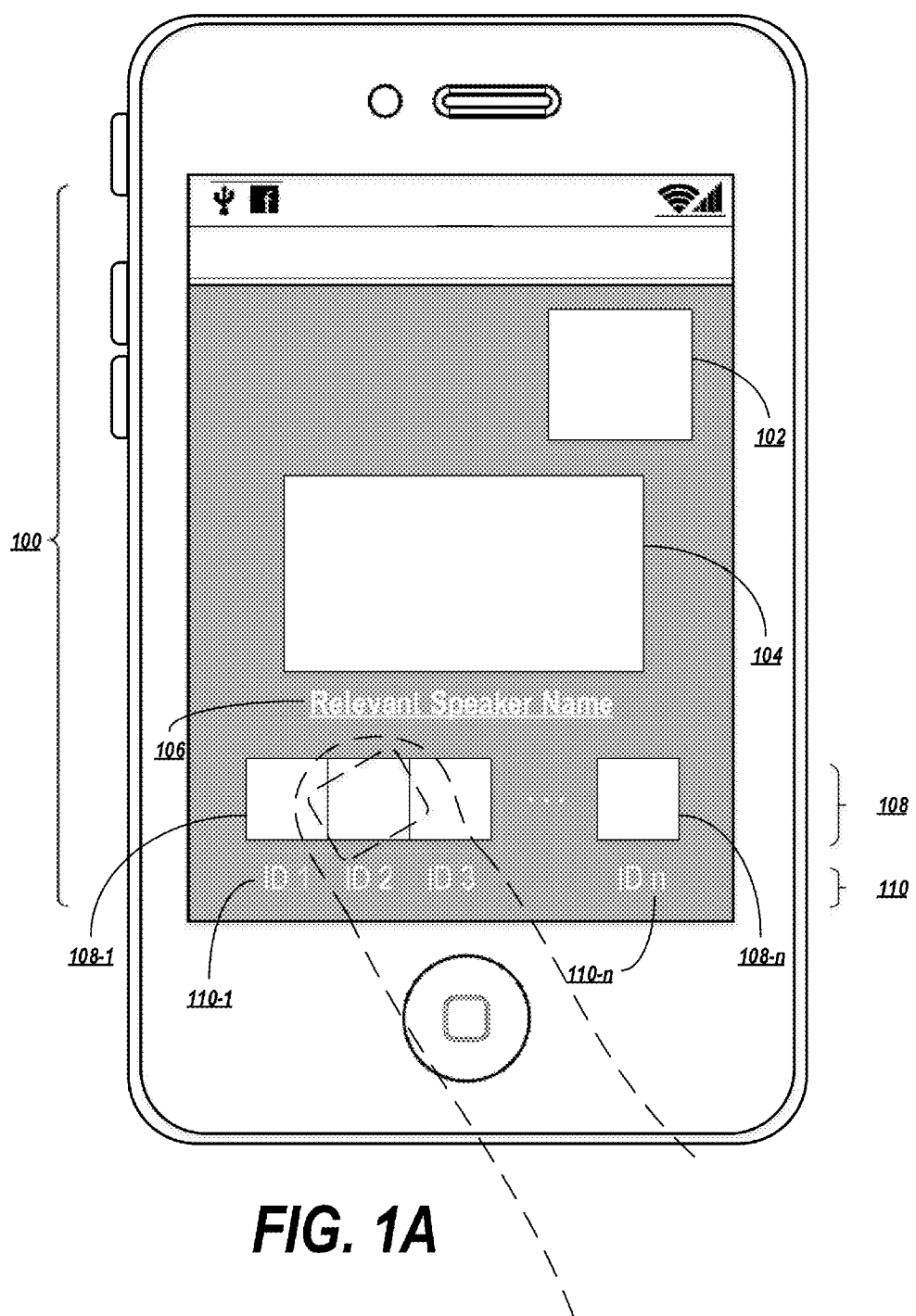
FIG. 1A depicts an exemplary interface for a group video communication.

A number of issues are presented when designing a call interface for a small display. For instance, many call interfaces show a large main window that includes the currently-active speaker and a smaller window for other participants. However, conventional techniques for selecting the active speaker suffer from deficiencies that may cause less-relevant speakers to be displayed in the main window.

For example, when a new active speaker becomes more dominant than an original active speaker, one possible technique is to display the new active speaker on each participants' display, except for the new active speaker. Instead of seeing themselves, the new active speaker may see, for example, the second-most active speaker. However, the second-most active speaker is typically not the most relevant person to display on the active speaker's interface; once the active speaker begins to speak, the second-most active speaker is typically not speaking themselves. Instead, the participant identified as the second-most-active may be flagged for the simple reason that noise is present in their audio channel, making it appear as though they are also speaking.

In another example of a possible technique, an interface may display the currently active speaker as soon as they become active. When multiple participants are speaking, or when some participants have noise on their audio channel, this may cause the display of the currently active participant to quickly change back-and-forth between different people.

When the second-most-relevant speaker is displayed on the currently active speaker's interface, and when the interface changes rapidly between multiple speakers, a video call may feel disjointed and less like a fluid conversation. This may detract from the experience of the video call.

On a large display, this problem is somewhat mitigated because the remaining (non-active) participants may be shown in sufficient detail in smaller windows beside the main window; however, on a small display (such as on a mobile device) there is often not sufficient room to display the remaining participants, or at least not to display them in sufficient detail to mitigate this problem.

Still further, call interfaces tend to dominate small screens, leaving little or no room to perform other activities.

Exemplary embodiments described below relate to techniques for selecting which users should be shown in an interface during a group call, and for presenting the users on (potentially small) displays. According to some embodiments, a most-relevant speaker is selected for display on each call participants' screen. When deciding which user to display in the primary window of a video call, a dominant or relevant user is selected. A dominant user may be selected based on the audio energy represented by the audio packets for the user's device; alternatively dominant user selection may be implemented using artificial intelligence or machine learning, allowing for better differentiation between speaking and noise. In some embodiments, a relevancy metric may be calculated for the users, and if one user is determined to be more relevant than the dominant speaker, the dominant speaker may be overridden with the relevant user. On each user's display that does not belong to the relevant/dominant user, the current relevant/dominant user is shown. On the current relevant user's display, the previous relevant user is shown.

Because the previous relevant user is shown on the active user's screen (instead of, e.g., the second-most-relevant user), the currently-active user is most likely to see the person who just spoke or was most recently relevant. As a result, the video call feels like a fluid conversation.

In some embodiments, a full-size call interface may be shrunk down into a chathead that makes good use of limited screen real estate, especially when being used on a mobile device. On the smaller chathead, the dominant user is shown, and a roster of users is shrunk and may exhibit reduced functionality. The chathead may be moved around the screen, and other applications may continue to run in the space not occupied by the chathead. As a result, the user can continue to interact with other applications or content on their device while still engaging in a video call. Using the above-noted techniques for selecting a relevant or dominant user, the main display is likely to be taken up with the speaker that the current participant most wants to see (thus, e.g., mitigating the effects of having a reduced-size interface on an already small display). These embodiments may be well-suited to situations such as multiplayer gaming, group sports watching, and business meetings, during which conversations between groups of people may be taking place in the context of other activities.

As an aid to understanding, a series of examples will first be presented before detailed descriptions of the underlying implementations are described. It is noted that these examples are intended to be illustrative only and that the present invention is not limited to the embodiments shown.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through 122-a may include components 122-1, 122-2, 122-3, 122-4, and 122-5. The embodiments are not limited in this context.

FIGS. 1A-1G depict various examples of full-sized interfaces for displaying a relevant user in a group call. FIG. 1A depicts a general example of the interface, while FIGS. 1B-1G show examples of the interface used in particular contexts.

FIG. 1A depicts an interface 100 for a communications application adapted to show a group video call. The interface 100 may be displayed on the device of a first user. The interface 100 may include a preview window 102, in which the first user can see the video feed that they are current sending to the rest of the participants.

The interface 100 may further include a main window 104 in which the speaker that has been currently selected as dominant or otherwise most-relevant is shown. The main window 104 may be the most prominent window in the interface 100, and may display a video feed that is larger in size and/or at a higher resolution than the video in the preview window 102 or other windows (such as the roster 108 described below). The main window 104 may display the speaker that is most dominant in the video call (e.g., the speaker who is determined to be most likely to be speaking and the current leader of the conversation, to whom other participants are currently listening). In some cases, another participant other than the most-dominant participant may be more relevant in the call than the most-dominant speaker. In these situations, the other most-relevant participant may be shown in the main window 104.

Optionally, the participant displayed in the main window 104 may be identified on the interface 100 by an identifier 106. The identifier 106 may be, for example, the name or handle of the participant displayed in the main window 104.

A roster 108 of participants in the call may also be displayed. The roster 108 may include a window 108-$i$ dedicated to each participant in the call, or may exclude the currently-relevant speaker displayed in the main window 104. Each window 108-$i$ may display a video feed of the associated participant (if such a feed is available). The roster 108 may be associated with some functionality. For example, selecting one of the windows 108-$i$ (as shown in FIG. 1A) may lock the selected participant to the main window for a period of time (or until the locking is manually canceled, or until an event occurs, such as another video feed becoming most relevant). Alternatively or in addition, selecting a window 108-$i$ may cause additional information about the associated participant to be displayed, among other possibilities. The windows 108-$i$ of the roster 108 may each be associated with an identifier 110-$i$ identifying the participant in the window 108-$i$. The identifier 110-$i$ may be, for example, a name or handle of the participant. In some cases, the participant may be associated with a long identifier and a short identifier (e.g., a full name and a nickname, or a full name and a first name only). In some embodiments, the short identifier may be displayed as the identifier 110-$i$, while the longer identifier may be displayed as the identifier 106 for the main window 104.

As noted above, the user appearing in the main window 104 may change as different users become dominant or more relevant. FIGS. 1B-1G show examples of different users becoming dominant, from the perspective of different participants in the video call. In these examples, the call is a three-way video call between the users Jack, Jill, and John.

On the bottom portion of FIGS. 1B-1G, a timeline is present showing the order in which different participants in the video call become the dominant speaker. As shown in these timelines, at time $t_{-1}$ Jack is the dominant speaker. At time $t_0$, Jill supersedes Jack to become the dominant speaker, and at time $t_1$ John supersedes Jill to become the dominant speaker.

FIG. 1B depicts the interface at time $t_0$ from the perspective of Jack (whose feed is shown in the preview window 102). Jill has just become the dominant user, superseding Jack. In this case, Jill appears in the main window 104 of Jack's display because Jill's feed is now dominant. More generally, when a new second dominant user supersedes an original first dominant user, the first dominant user's main window 104 displays the video stream of the second dominant user.

FIG. 1C depicts the interface at time $t_1$ from the perspective of Jack (whose feed is shown in the preview window 102). John has just become the dominant user, superseding Jill. In this case, John appears in the main window 104 of Jack's display because John's feed is now dominant. More generally, when a new second dominant user supersedes an original first dominant user, a third party's display (not belonging to the first dominant user or the second dominant user) shows the second dominant user's video stream.

FIG. 1D depicts the interface at time $t_0$ from the perspective of Jill (whose feed is shown in the preview window 102). Jill has just become the dominant user, superseding Jack. In this case, Jack appears in the main window 104 of Jill's display because Jill's feed is now dominant, but Jill's feed is not generally displayed in the main window 104 of Jill's own display. Instead, Jill's main window 104 displays the previous dominant speaker (Jack). More generally, when a new second dominant user supersedes an original first dominant user, the second dominant user's main window 104 shows the previous dominant speaker (in this case the first dominant speaker).

FIG. 1E depicts the interface at time $t_1$ from the perspective of Jill (whose feed is shown in the preview window 102). John has just become the dominant user, superseding Jill. In this case, John appears in the main window 104 of Jill's display because John's feed is now dominant. More generally, when a new second dominant user supersedes an original first dominant user, the first dominant user's display shows the second dominant user's video stream.

FIG. 1F depicts the interface at time $t_0$ from the perspective of John (whose feed is shown in the preview window 102). Jill has just become the dominant user, superseding Jack. In this case, Jill appears in the main window 104 of John's display because Jill's feed is now dominant. This context is similar to the one depicted in FIG. 1C.

FIG. 1G depicts the interface at time $t_0$ from the perspective of John (whose feed is shown in the preview window 102). John has just become the dominant user, superseding Jill. In this case, Jill continues to appear in the main window 104 of John's display because, although John's feed is now dominant, John's feed is not generally shown in John's own main window. This context is similar to the one depicted in FIG. 1D.

In some cases, there may not be a previous dominant user to display in contexts similar to the one depicted in FIGS. 1D and 1G. For example, when a video call is first initiated, there may not be a previous dominant user. In this case, a default user may be shown in the main window (e.g., the call organizer), or no user may be shown in the main window, among other possibilities.

Although dominance is used as the primary metric in the examples depicted in FIGS. 1B-1G, other relevancy metrics may also be considered. FIGS. 2A-2C depict an example in which a relevancy metric overrides dominance in a call. In these examples, a timeline at the bottom of each Figure show which user is dominant through a portion of the call. In this case, Jill is the dominant speaker at times $t_0$, $t_1$, and $t_2$.

FIG. 2A depicts Jack's interface at time $t_0$, and hence Jack's feed appears in the preview window 102. At this time, Jill is the dominant speaker and there is no other relevant information to cause Jill's designation as the most-relevant participant to be overridden. As a result, Jill's feed appears in Jack's main window 104.

FIG. 2B depicts Jack's interface at time $t_1$. At this time, Jill remains the dominant speaker. However, something occurs in John's feed that causes John's feed to become particularly relevant. For instance, in this example a media effect 202 is applied to John's feed. Media effects may come in a variety of forms, and may include (for example) graphical overlays applied to a feed by the owner of the feed or another user, audio tracks added to a feed, augmented reality effects added to a feed, filters or distortions applied to a feed, etc. The addition of a media effect 202 may cause John's feed to become particularly relevant for a period of time (e.g., for the duration of the media effect or for some other period of time). This relevancy may be evaluated in view of a relevancy metric and, if the relevancy is sufficient, may cause the dominant speaker to be overridden. In this example, John's relevant feed overrides Jill's dominant feed, and John's feed is shown in the main window 104 of Jack's interface (meanwhile, on John's interface, either John's media-enhanced feed may be displayed in the main window 104, or the previous relevant user, in this case Jill, may be shown).

Eventually, the media effect 202 may wear off, and the main window 104 may revert to the dominant speaker as shown in FIG. 2C. In some cases, the main window 104 may revert to the dominant speaker before the media effect 202 wears off, if the relevancy associated with the user to whom the media effect has been applied falls below a level that allows the relevancy to override the dominant speaker.

Figure 3A:
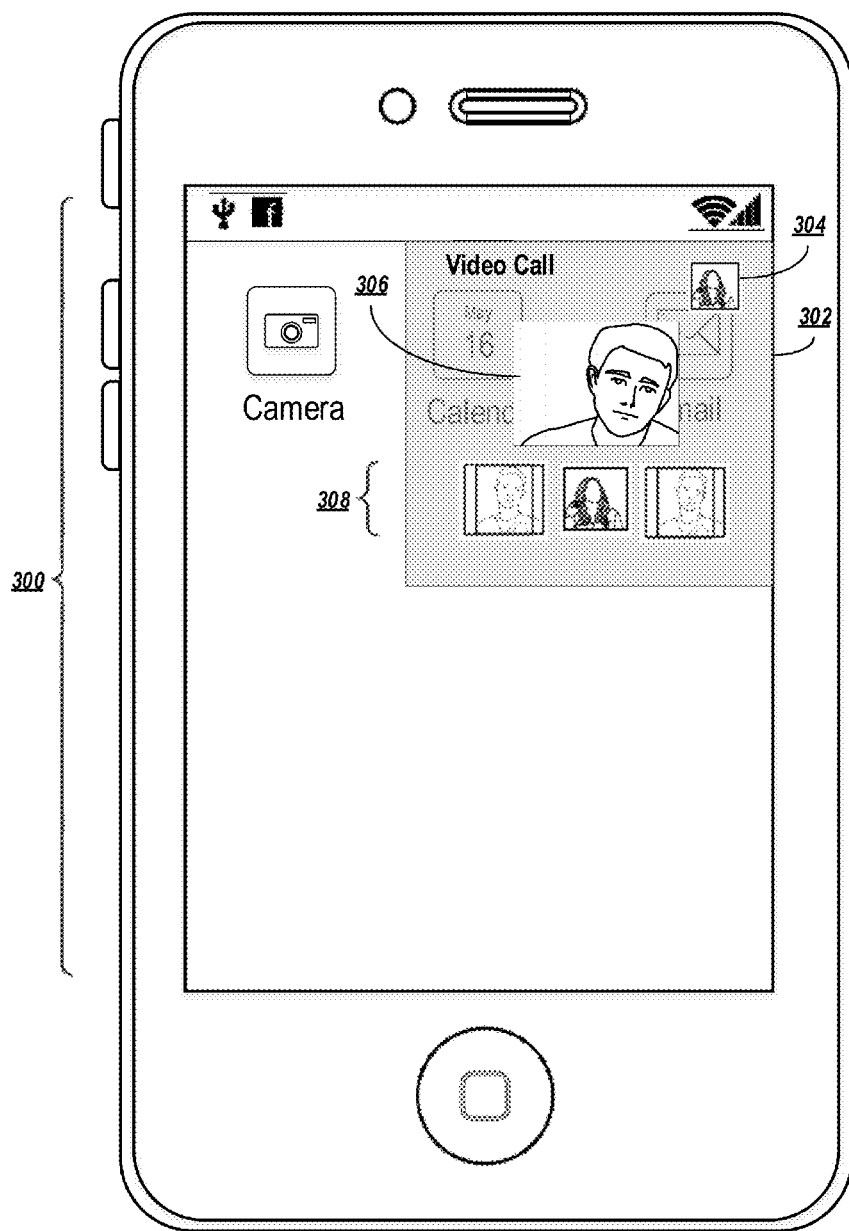
FIG. 3A depicts an exemplary communications interface having a reduced size.

FIGS. 1A-2C depict examples of full-size interfaces. In some embodiments, an option may be provided to shrink the full-size interface to a reduced-size interface 302, as shown in FIG. 3A. The reduced-size interface 302 may take up a portion of the available display area that is less than the entirety of the display area, e.g. half or less of the display area.

The full-size interface may be shrunk, for example, in response to selecting a button in the full-size interface, registering a particular touch gesture on the full-size interface, audio commands, etc. When changing from the full-size interface to a reduced-size interface 302, an animation may cause the full-size interface to shrink and smoothly transition into the reduced-size interface 302.

The reduced size interface 302 may be displayed on top of a secondary interface 300. The secondary interface 300 may be, for example, another application interface or an interface for an operating system. The secondary interface 300 may support operations being performed concurrently with the video call shown in the reduced-size interface 302 such that the user can interact with the secondary interface 300 while still remaining in and viewing the video call.

The reduced-size interface 302 may optionally include a preview window 304, similar to the preview window 102 shown in FIG. 1A. The preview window 304 may optionally display a reduced-resolution video feed associated with the user of the device on which the reduced-size interface 302 is displayed. Alternatively or in addition, one or more call controls may be displayed in this location (e.g., mute, end call, transition to full-size interface, etc.).

The reduced-size interface 302 may further include a main window 306 (e.g., corresponding to the main window 104 in FIG. 1A). The main window 306 may display the dominant or relevant user as described above.

The reduced-size interface 302 may further include a roster 308 displaying information pertaining to other users in the call (e.g., the users not appearing in the main window 306, possibly with the exception of the device owner who is displayed in the preview window 304.

The roster 308 may be similar to the roster 108 described in connection with FIG. 1A, but may exhibit reduced functionality. For example, the roster 308 may display information such as a picture or ID of the user, but may not display a current video feed from the user. Alternatively or in addition, the roster 308 may provide no interactive functionality (e.g., selecting a user to lock the main window 306 on the user's video feed), whereas such functionality may be provided by the full-size roster 108.

When an interaction is registered in an area of the display, the interface affected by the interaction may be dependent on where the interaction is received. For example, if the interaction is registered in the reduced-size interface 302, the interaction may trigger an action with respect to the reduced-size interface 302 (e.g., moving the reduced-size interface 302, growing the reduced-size interface 302 to a full-size interface, muting the current user's audio and/or video feed, etc.).

Figure 3B:
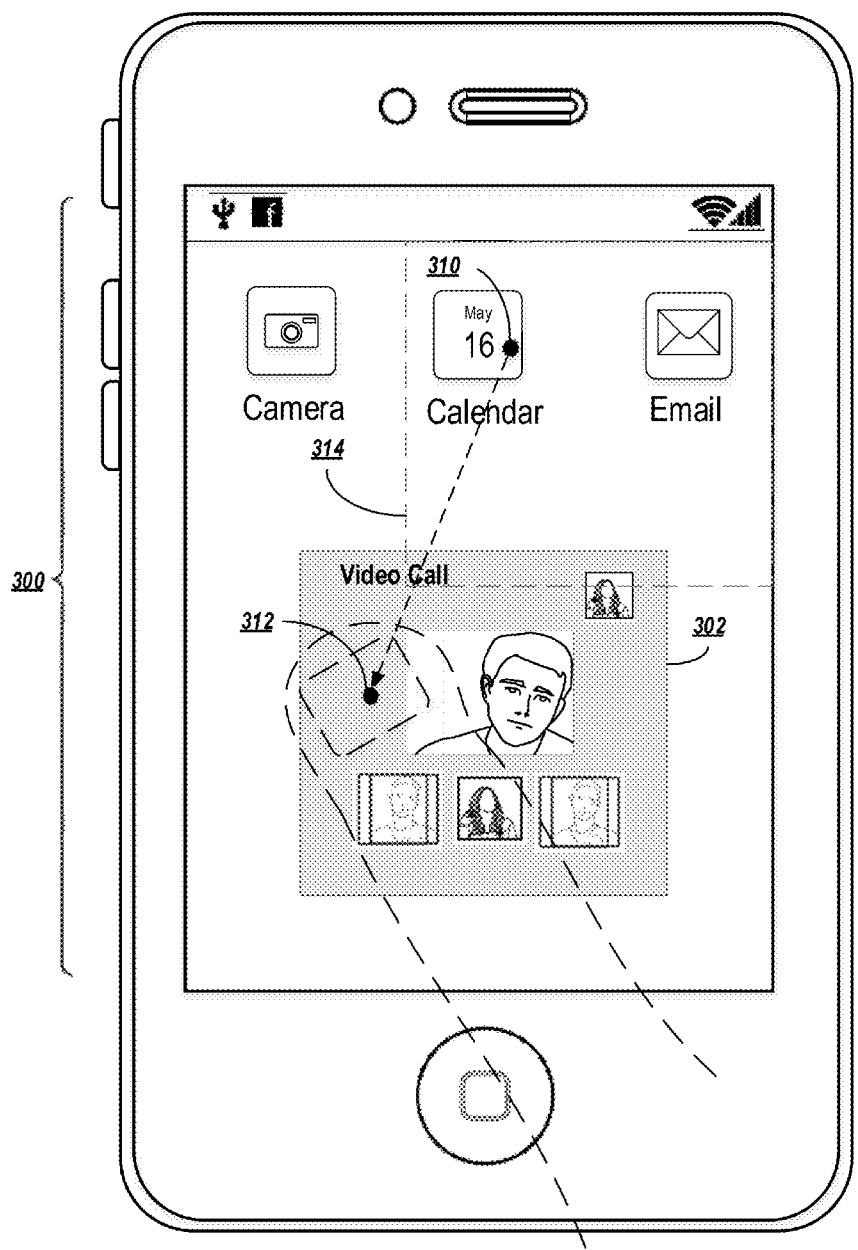
FIG. 3B depicts examples of various interactions with the communications interface of FIG. 3A.

For instance, FIG. 3B depicts an example of moving the reduced-size interface 302 on a touch screen. The dashed lines 314 indicate an original location of the reduced-size interface 302. A haptic contact signal is registered at a first location 310, which is determined to be within the boundaries of the reduced-size interface 302. The user then slides their finger to a second location 312, and a haptic release signal is detected at the second location 312. Based on the difference between the first location 310 and the second location 312, the reduced-size interface 302 may be moved to a new location over the secondary interface 300.

In some cases, certain interactions (e.g., certain touch gestures) may be configured to send commands directly to the reduced-size interface 302 regardless of where the interactions are registered. For example, a three- or four-finger pinch-out gesture may cause the reduced-size interface 302 to transition into a full-size call interface regardless of whether the pinch-out gesture is registered partially or entirely outside of the reduced-size interface 302.

The size and/or position of the reduced-size interface 302 may vary automatically depending on the context. In some embodiments, a portion of the secondary interface 300 may be identified as particularly relevant or important, and the reduced-size interface 302 may be automatically sized and positioned so as to avoid the relevant or important portion(s). For instance, if the secondary interface 300 pertains to a game having controls and a primary display area, the reduced-size interface may be automatically sized and positioned so as not to cover the controls or display area. In some cases, the secondary interface 300 may define (e.g., through metadata) an acceptable area in which the reduced-size interface 302 may be displayed.

Figure 3C:
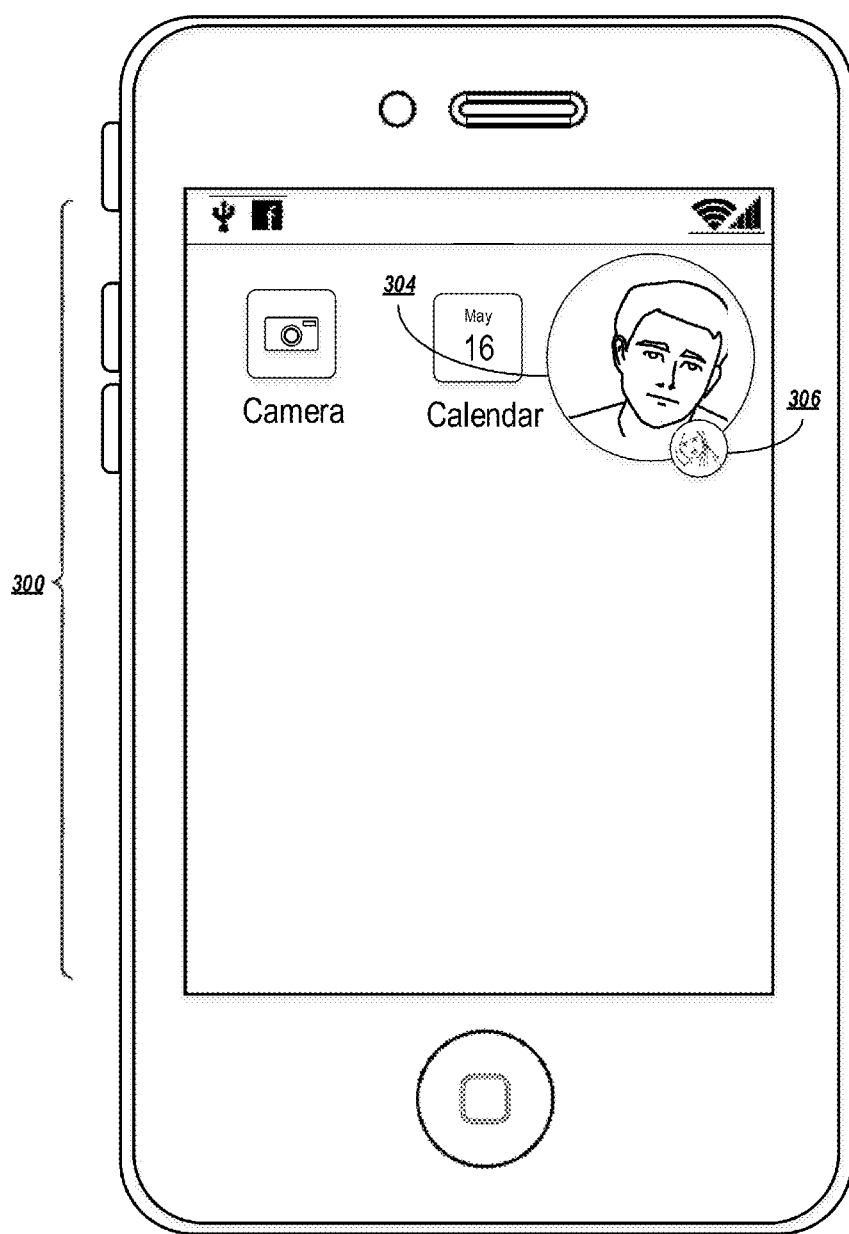
FIG. 3C depicts an alternative exemplary communications interface having a reduced size.
Figure 3D:
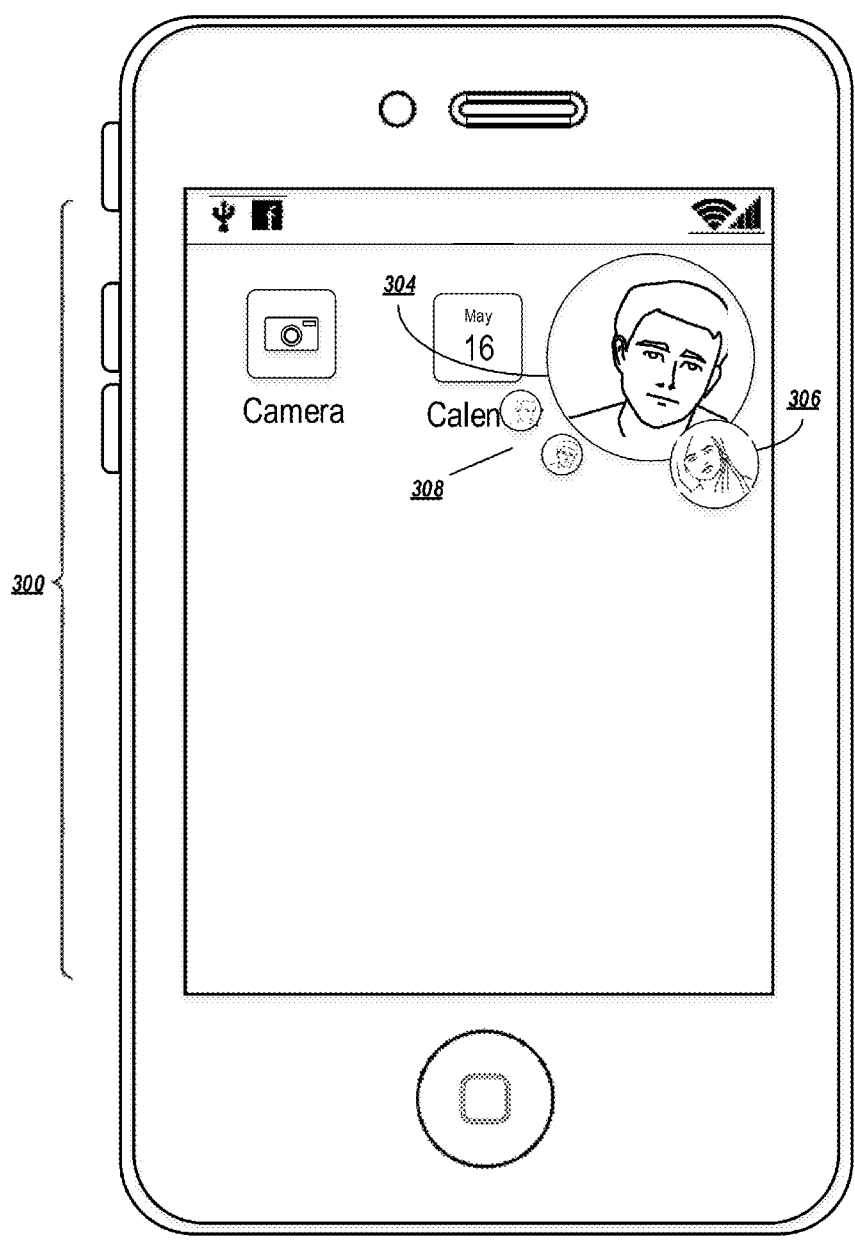
FIG. 3D depicts an alternative exemplary communications interface having a reduced size and a roster.

The embodiments depicted in FIGS. 3A and 3B are exemplary, and other configurations of the main window 304, the preview window 306, and the roster 308 may be used. For example, FIG. 3C depicts an embodiment in which the main window 304 and the preview window 306 are circular in shape, with the preview window 306 overlaid on the main window 304. The embodiment in FIG. 3C omits the roster 308; in another embodiment depicted in FIG. 3D, the roster 308 may also be represented as a set of circular windows. As in previous embodiments, the chatheads depicted in FIGS. 3C and 3D may be moved around the display, and the roster 308 may exhibit reduced functionality as compared to full-screen embodiments.

Using dominant and/or relevant speaker detection as described herein, alone or in conjunction with a reduced-size interface, video calls appear to be more fluid and conversation-like, particularly on a device having a small screen (although embodiments are not limited to small-screen devices). Moreover, the reduced-size display allows a user to participate in a video call on a small screen device while still taking part in other activities, some of which may be enhanced by the participation in the group call (e.g., games, sporting events, presentations, etc.)

This brief summary is intended to serve as a non-limiting introduction to the concepts discussed in more detail below, in connection with FIGS. 4-8C. However, before discussing further exemplary embodiments, a brief note on data privacy is first provided. A more detailed description of privacy settings and authentication will be addressed in connection with the following Figures.

A Note on Data Privacy

Some embodiments described herein make use of training data or metrics that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Figure 4:
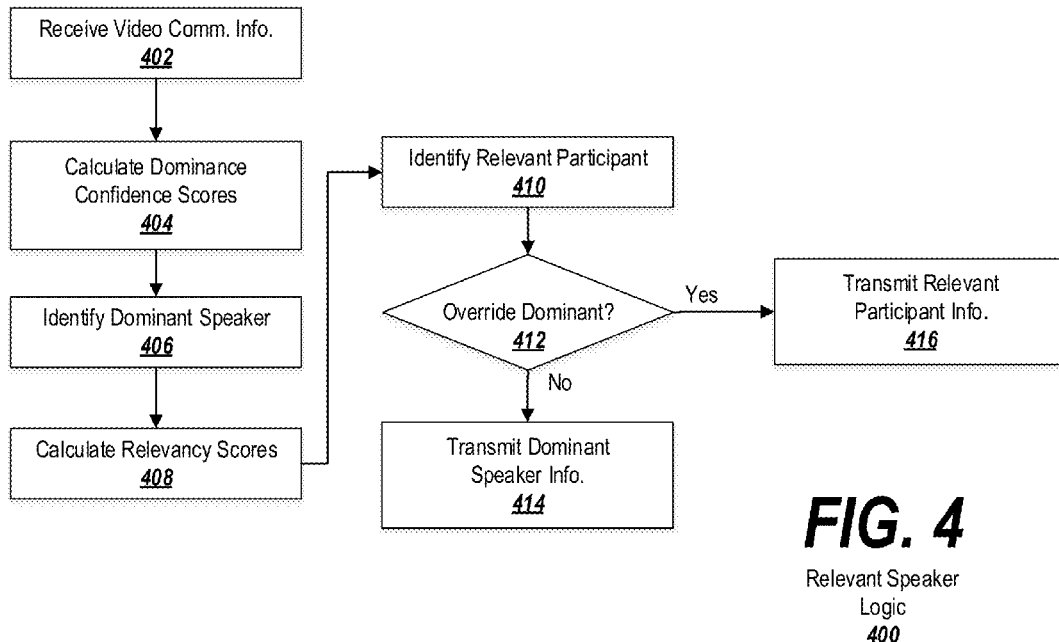
FIG. 4 is a flowchart depicting an exemplary method for selecting a relevant participant.

Assuming a user's privacy conditions are met, exemplary embodiments may be deployed in a wide variety of messaging systems, including messaging in a social network or on a mobile device (e.g., through a messaging client application or via short message service), among other possibilities. An overview of exemplary logic and processes for engaging in synchronous video conversation in a messaging system is next provided Relevant Speaker Detection Any or all of the above-described interfaces may be presented as part of a set of procedures for facilitating video communications. FIG. 4 is a flowchart depicting an exemplary process 400 for selecting a relevant user for display in a main window of a communications application.

At block 402, a system (such as a communication server) may receive video communication information pertaining to one or more participants in a video communication. The video communication information may be in the form of data packets containing audio and/or video information, such as the exemplary data packet described below in connection with FIG. 5.

At block 404, the system may calculate one or more dominance scores associated with the video communication information received at block 402. The dominance scores may represent a degree of confidence of the system that the user associated with the video communication information is the current active or dominant speaker in the video communication. The confidence may be determined by tracking the average audio energy in the user's communication feed over a period of time, and selecting the user having the highest audio energy over that period of time.

In some embodiments, the system may attempt to accommodate noise in the user's audio feed by reducing the level of audio energy by an amount of estimated noise in the feed. For example, the system may determine an amount by which the present level of audio energy deviates from a recent average level of audio energy, and may assume that the average level represents noise while the deviation amount represents active speech.

In some embodiments, if the candidate's current confidence level is high, but the confidence level is decreasing, the system may defer or refrain from changing dominant speakers under the assumption that the speaker will not be dominant in the near future.

In some embodiments, the system may weigh the dominance or confidence scores based on an amount of time that has elapsed since the current dominant speaker was selected. This may prevent the system from rapidly changing between dominant speakers.

In some embodiments, the system may account for brief breaks in the speech of the dominant speaker by refraining from changing from one dominant speaker to another if the current dominant speaker's speech level is not sustained for a short predetermined period of time.

Once the dominance and/or confidence scores are calculated, at block 406 the system may identify a current dominant speaker. For example, the video communication may be associated with a communication ID, and the system may maintain a table or other data structure having entries associated with each participant in the video call. The entries may include fields to store an identifier for the participant, variables relating to a dominance score for the participant, variables relating to a relevance score for the user, etc. The variables relating to the dominance score (or the dominance/confidence score itself, if this value is stored in the table) may be compared between the different participants and the highest confidence score may be selected. The user having the highest confidence score may be identified as the dominant user. In some embodiments, one or more rules may be applied to prevent rapid or unnecessary switching between dominant users, as outlined above.

Exemplary pseudocode for calculating dominance scores and selecting a dominant user is provided below. Although this pseudocode uses particular values for variables (e.g., background noise in the last 15 s, average audio level in 600 ms, etc.), these values are intended to be exemplary only. The present invention is not limited to the specific values described.

Pseudocode:

Input: Audio Energy Level from multiple user feeds. User feed is represented by encoded audio data sent to communication server every 30 ms in the form of data packets. Each data packet includes a byte indicating the audio energy level ranging from 0 to 127 (e.g., as generated by the WebRTC audio processing pipeline). Higher values mean higher energy level. Zero means the device mic is turned off.

For each user feed, calculate the following stats that will be used to select dominant speaker:
1. Background noise level average in last 15 s ("background_ma15 s"): Moving average of audio energy level for the last 15 s. When the user is talking, the value tends to go up which makes the value higher than the actual background noise level. To compensate for that, modify the moving average slightly so the calculated background noise level is less impacted by an active talking user:
   1. When a new value is added to the moving average, and if the new value is bigger than previous value, modify the new value to a smaller value: new_value=previous_value+(new_value−previous_value+2)/3
   2. When new value is smaller than previous value, new value is not modified.
2. Audio level average in last 600 ms ("audio_ma600 ms")
3. Noise deviation: audio level−audio_ma600 ms
4. Noise deviation average in last 600 ms ("noise_deviation_ma600 ms")
5. Audio level average in last 3 s ("audio_ma3s")
6. Speech confidence level ("confidence"): audio_ma600 ms−background_ma15s.
7. Max Confidence level in last 600 ms: the max value of confidence level in last 600 ms ("confidence_600 ms").

Dominant speaker Selection (algorithm is run every 300 ms, or if dominant speaker changes from unmuted to muted):
1. Find the candidate with highest confidence_600 ms (Max confidence level in last 600 ms)
2. If candidate is same as old dominant speaker, keep the dominant speaker
3. Otherwise compare candidate with old dominant speaker:
   1. If old dominant speaker is recently selected, the candidate needs a higher confidence level for switch
   2. The current dominant speaker has high confidence level in last 3 s, but low confidence level now (6 db difference) (audio_ma3s−audio_ma600 ms>noise_deviation_ma600 ms+6), don't switch. (The current dominant speaker is during speech break, and may be back to talking mode soon).
   3. If candidate's confidence level is going downwards (audio_ma3s>=audio_ma600 ms), don't switch.
   4. If candidate's confidence level change is within its noise range, require additional 3 db to select candidate.
   5. Do the switch if candidate's confidence level is bigger than current dominant speaker plus the additional dbs.

At block 408, the system may apply one or more relevancy metrics to calculate relevancy scores. For example, if a media effect is applied to a particular user, that user's relevancy score may rise. Other relevancy metrics may also be applied (e.g., if it is determined through machine learning or artificial intelligence that the current dominant speaker is speaking about another participant, then in some conditions the other participant that is the subject of the conversation may be more relevant to display than the dominant speaker). The relevancy score may be calculated based on, for example, a type of media effect, an amount of time that the media effect is applied, contextual information, etc.

When media effects are applied to multiple different feeds simultaneously, the scores associated with each feed may be the same or may differ. For example, if the same media effect is applied to each user, and there is nothing else to distinguish the users in this regard, the same score may be applied. If a different media effect is applied at each user (e.g., a sender blows a kiss to a recipient, causing an animation to be displayed on both the senders' and the recipients' feed), then the scores may differ. The amount of difference in the scores may depend on a type of the media effect.

At block 410, the system may identify a relevant participant, which may differ from the dominant speaker. The relevant participant may be the user having the highest relevancy score. Instead of calculating relevancy scores, relevancy may be a binary condition (e.g., when a media effect is applied, the affected user becomes the relevant user without the need to calculate a relevancy score).

At block 412, the system may determine whether to override the dominant speaker. If the confidence score associated with the user's dominance is particularly high (e.g., above a predetermined threshold or more than a certain proportional amount over the relevancy score), then dominance may trump relevance and the dominant user may be selected for display. If the relevancy score is particularly high, then relevancy may trump dominance. In some cases, a dominant user may be selected by default, and a relevant user may override the dominant user any time a certain event occurs (e.g., the application of a media effect). In further embodiments, whether to override the dominant user with a relevant user may be determined based on user preferences.

If the determination at block 412 is "NO" (i.e., the relevant user should not override the dominant user), then processing may proceed to block 414 and the dominant user may be selected for display. The server may transmit information causing the dominant user to be displayed on each of the displays not belonging to the dominant user. For example, an ID associated with the dominant user and/or the dominant user's video feed may be transmitted to each of the other users. For the dominant user, the system may transmit the ID of the previous dominant or relevant user, causing the dominant user to continue to display the previous relevant/dominant user. Alternatively, the system may transmit the dominant user ID to all participants; when the new dominant user's device receives their own ID, the device may be configured to continue to display the previous dominant relevant user.

If the determination at block 412 is "YES" (i.e., the relevant user should override the dominant user), then processing may proceed to block 416 and the relevant user may be selected for display. The relevant user's ID and/or video feed may be sent in a manner similar to that described for the dominant user in block 414.

Figure 5:
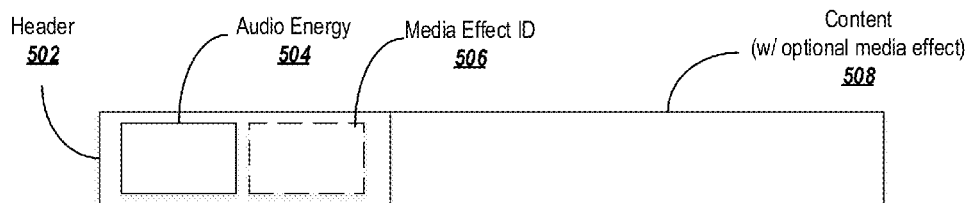
FIG. 5 depicts a simplified data structure for a communications packet suitable for use with exemplary embodiments.

FIG. 5 depicts an exemplary data structure suitable for use as a data packet in exemplary embodiments such as the one described above. One example of a suitable data packet is a Web Real Time Communications (WebRTC) packet.

The data packet may include a header 502 having a fixed or variable size. The header 502 may include metadata pertaining to the data packet, such as a level of audio energy 504. The level of audio energy 504 may be represented by a value, such as an integer between 0 and i (e.g., $i=2^n-1$, where n is an integer relating to a size of i as represented in the header). The audio energy 504 may be used to determine which speaker is currently dominant, as described above in connection with FIG. 4.

The header 502 may optionally include a media effect flag and/or media effect ID 506. The media effect ID 506 may indicate the presence of a media effect applied to the video stream associated with the data packet. If the media effect is applied at a server, the media effect ID 506 may be used by the server to apply the media effect and then a modified video feed (including the media effect) may be sent to client devices for rendering in the video call. If the media effect is applied locally at a sender client device, the media effect may already be represented in the content 508 of the data packet; the media effect ID 506 may signal the presence and/or type of the media effect. If the media effect is applied locally at recipient client devices, then a server may send a raw video feed to the client devices along with the media effect ID 506; the recipient devices may then apply the media effect locally.

The media effect ID 506 may be used to determine relevancy, which may override dominance as described above in connection with FIG. 4. In some embodiments, media effects may be added to video and/or audio content through separate transmissions. For example, in some embodiments, information pertaining to media effects may be transmitted in a control channel separate from the audio and video data. In these cases, the server may account for the media effect by considering the separate transmissions when calculating a relevancy score related to the data packet.

The data packet may also include content 508, which may include audio and/or video data associated with a user's video stream or feed. If the data packet includes the audio energy field 504 in the header 502, then it may not be necessary for the server to analyze the content 508 when determining dominance. In some embodiments, however, the server may analyze the content 508 (e.g., with machine learning or artificial intelligence algorithms) in order to better distinguish relevant audio energy from irrelevant audio energy. For example, noise may be filtered out or not considered when determining dominance.

Figure 6:
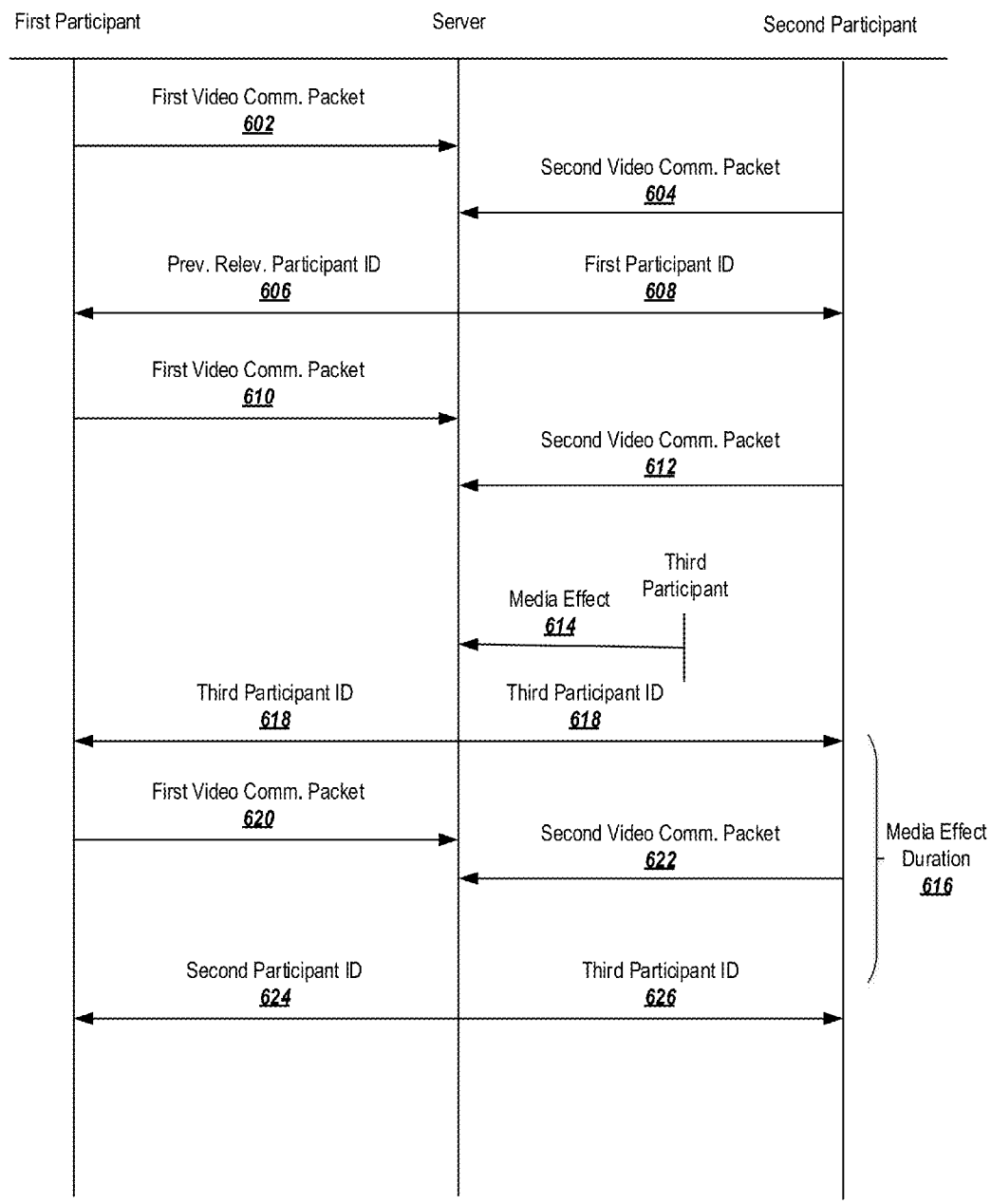
FIG. 6 is a data flow diagram depicting an exchange of information in a network when selecting a relevant participant according to exemplary embodiments.

An example of information exchange according to one example is depicted in the data flow diagram of FIG. 6. A server may receive a first video communications packet 602 from a first participant's device and a second video communications packet 604 from a second participant's device. The first video communications packet 602 and the second video communications packet 604 may be data structures similar to the one depicted in FIG. 5.

Upon receiving the communications packets, the server may determine that the first participant is the current dominant speaker, and that there are no other relevant speakers to override the dominant speaker. Accordingly, the server sends the first participant ID 608 to the second participant's device, and the second participant's device correspondingly displays the first participant in the main window of a communications interface.

In this example, the server also sends the ID 606 of the previous relevant participant to the first participant's device, causing the first participant's device to continue display the previous relevant participant. In other embodiments, the server may send the first participant ID 608 to the first participant's device, and the first participant's device may interpret this as an instruction to continue to display the previous relevant participant. In further embodiments, the server may send no information to the first participant at this stage, and the first participant may simply continue to display the previous relevant participant in the absence of instructions to change the participant shown in the main window of the communications interface.

The first participant's device continues to send another communication packet 610 to the server, and similarly the second participant's device sends a second communication packet 612. The server analyzes these packets and concludes that the first speaker remains the dominant speaker, and that there are no other relevant speakers to override the dominant speaker. The server accordingly does not make any changes. Alternatively, the server could re-send relevant IDs to the participants.

A third participant's in the conversation then applies a media effect 614 to the third participant's video stream, causing the server to determine that the third participant is now a relevant participant. The media effect is applied for a media effect duration 616.

Even though the first participant remains the dominant speaker, the server overrides the dominant speaker determination and sends the third participant ID 618 to the first participant and the second participant. The first participant and the second participant receive the ID 618 and display the third participant in the main window of their respective communication interfaces. Although not shown, the third participant would continue to display the previous dominant/relevant participant (i.e., the first participant).

During the media effect duration 616, the third participant remains the relevant speaker. In this example, the server receives a first video communication packet 620 from the first participant and a second video communication packet 622 from the second participant. Analysis of these packets by server indicates that the second participant has now become the dominant speaker, superseding the first participant. However, because the third participant remains the relevant participant during the media effect duration 616, the server refrains from updating the first participant and the second participant with a new dominant/relevant speaker.

After the media effect duration 616 expires, the server now forwards the second participant ID 624 to the first participant, and the first participant's device displays the second participant's vide feed in the main window. Because the second participant's device does not display its own video feed in the main window, the second participant is provided with the ID 626 of the previous dominant/relevant participant (in this case, the third participant).

Video Chathead

The above-described relevant/dominant participant selection provides reassurance that the speaker displayed in the main window is the one that the conversation participants most likely want to see at any given moment. This allows for reduced-size interfaces to be more effectively deployed, because the reduced screen real estate available is put to better use as compared to other techniques for selecting a speaker for the main window. FIG. 7 is a flowchart depicting exemplary display logic 700 for displaying a reduced-size interface on a touch-screen display.

At block 702, a system (e.g., a client device) may display a full-size interface for a video communication. The full size interface may be an interface such as the one depicted in FIG. 1A.

At block 704, the system may receive an instruction to display a reduced-size interface. For example, the system may receive a selection of a selectable element on the full-size interface, or may register a gesture, an audio command, etc. indicating that the full-size interface should be shrunk. Accordingly, at block 706 the system displays the reduced-size interface. In transitioning from the full-size interface to the reduced-size interface, the system may display an animation that causes the full-size interface to reduce in size and smoothly transition to the reduced-size interface. The reduced-size interface may be similar to the interface depicted in FIG. 3A.

At block 708, the system may display a relevant participant. For example, the system may receive an identifier of a relevant participant from a server, and may display the relevant participant in a main window of the reduced-size interface. The relevant participant may be selected by a method similar to the one depicted in FIG. 4.

At block 710, the system may register one or more haptic signals (or, as in the case of a non-touch interface, other types of signals indicating an interaction or command). At block 712, the system may determine whether the haptic signals were registered in an area of the screen dedicated to the reduced-size interface. For example, the system may compare an (x,y) location of the haptic signals to the boundaries of the reduced-size interface to determine whether the interaction occurred in an area bounded by the interface.

If the determination at block 712 is "YES" (i.e., the interaction was inside the interface), then at block 714 the system may register the interaction to the reduced-size interface of the video communication application and may interpret the haptic signals as an instruction to perform an action with respect to the interface. For example, the interface may be moved, resized, the call may be muted, etc. depending on the particular interaction triggered.

If the determination at block 712 is "NO" (i.e., the interaction was not inside the interface), then at block 716 the system may register the interaction to the other application (or the operating system) present in the remainder of the display area. Processing may then return to block 708 and relevant participant processing may be performed.

In some embodiments, certain gestures may be registered to the reduced-size interface, even though they occur partially or entirely outside the reduced-size interface.

Messaging System Overview

Figure 8A:
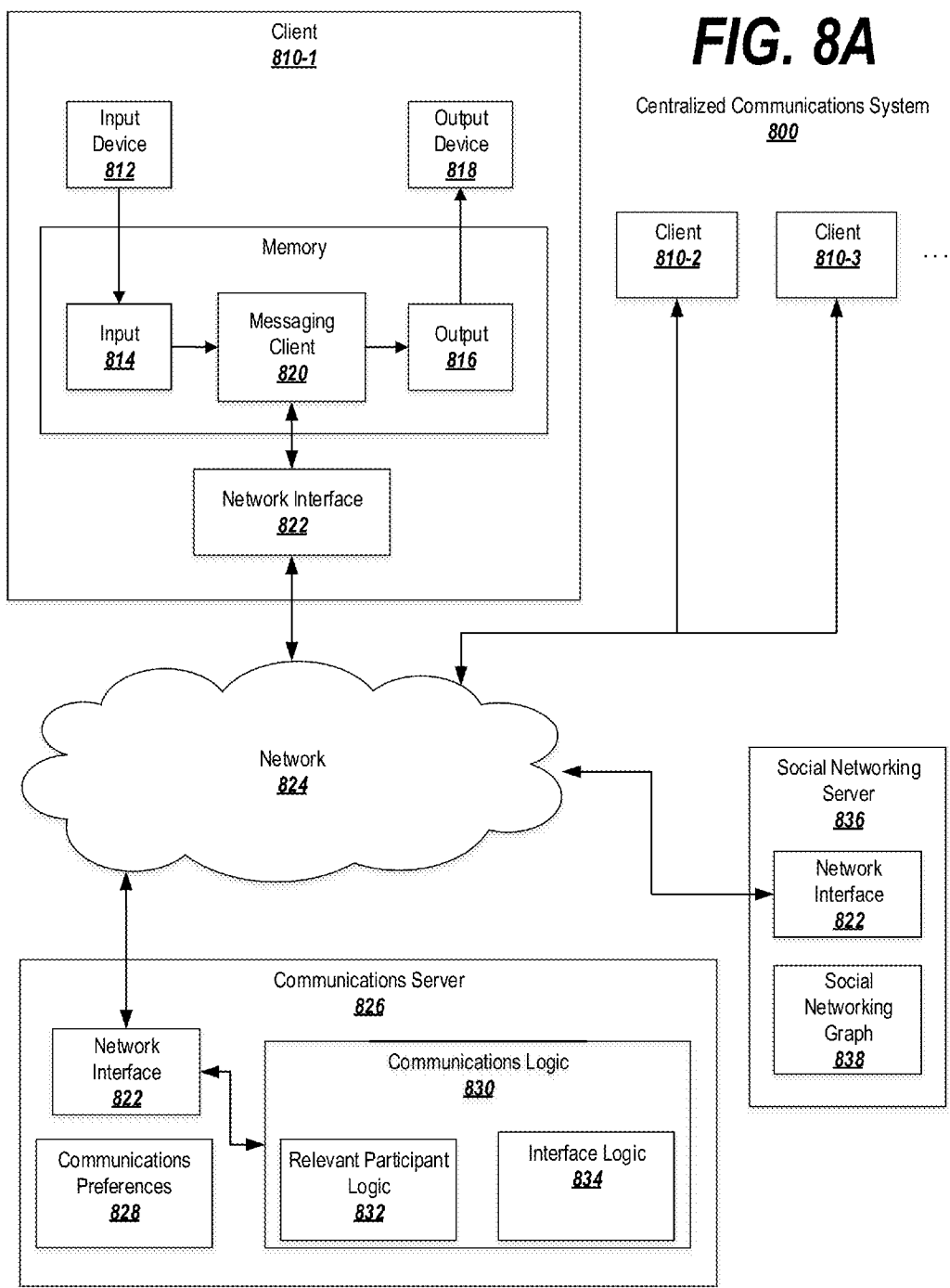
FIG. 8A is a block diagram providing an overview of a system including an exemplary centralized communications service.
Figure 8C:
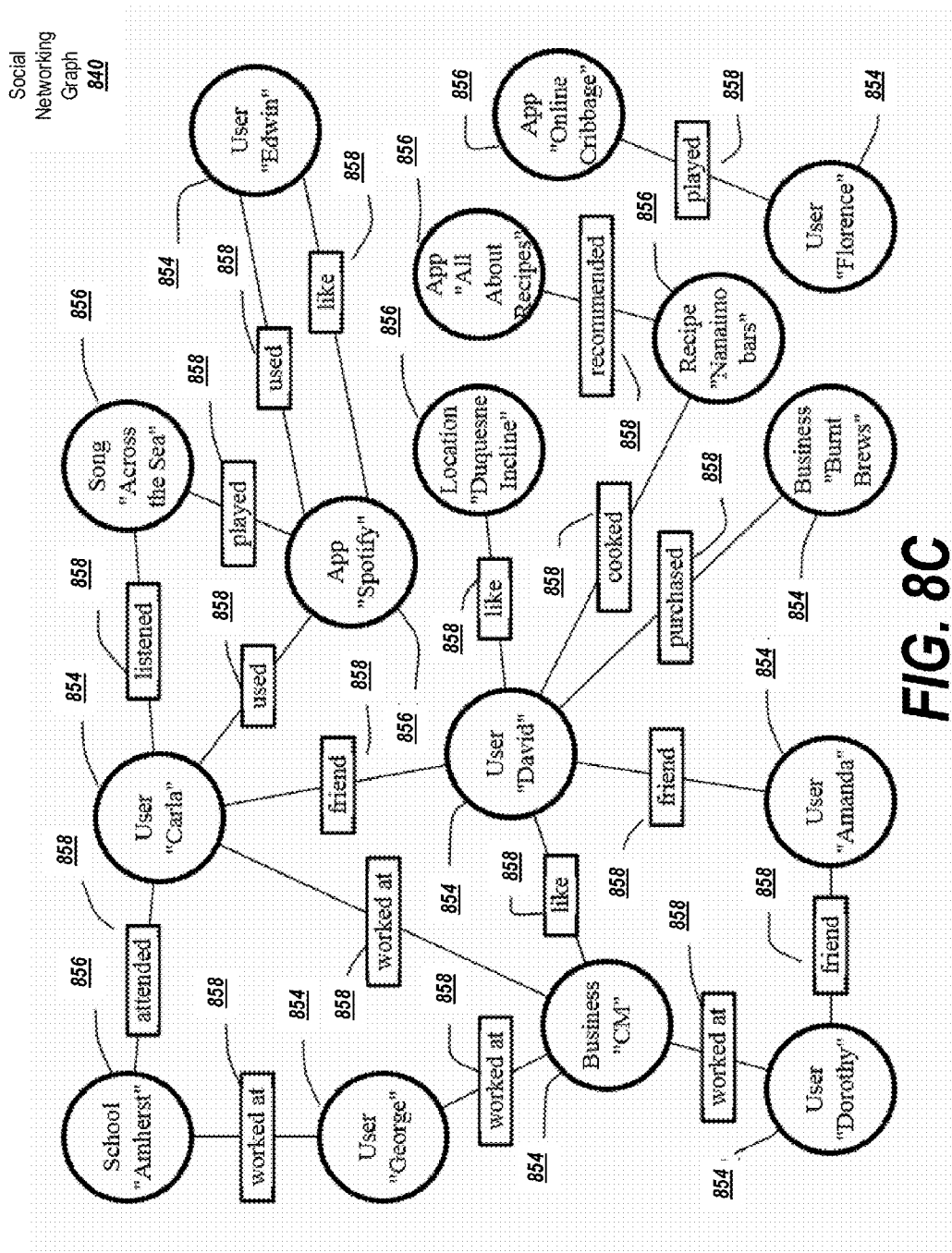
FIG. 8C depicts the social networking graph of FIGS. 8A-8B in more detail.

These examples may be implemented by a video communications system that is provided locally, at a client device, or remotely (e.g., at a remote server), or some combination thereof. FIGS. 8A-8C depict various examples of communications systems, and are discussed in more detail below.

FIG. 8A depicts an exemplary centralized communications system 800, which facilitates video communications between two or more users. The centralized system 800 may implement some or all of the structure and/or operations of a messaging service in a single computing entity, such as entirely within a single centralized server device 826.

The communications system 800 may include a computer-implemented system having software applications that include one or more components. Although the messaging system 800 shown in FIG. 8A has a limited number of elements in a certain topology, the messaging system 800 may include more or fewer elements in alternate topologies.

A communications service 800 may be generally arranged to receive, store, and deliver video communications.

A client device 810 may transmit video communications addressed to one or more recipient users, user accounts, or other identifiers resolving to receiving client devices 810. In exemplary embodiments, each of the client devices 810 and their respective clients 820 are associated with a particular user or users of the communications service 800. In some embodiments, the client devices 810 may be cellular devices such as smartphones and may be identified to the communications service 800 based on a phone number associated with each of the client devices 810. In some embodiments, each client may be associated with a user account registered with the communications service 800. In general, each client may be addressed through various techniques for the reception of video communications. While in some embodiments the client devices 810 may be cellular devices, in other embodiments one or more of the client devices 810 may be personal computers, tablet devices, any other form of computing device.

The client 810 may include one or more input devices 812 and one or more output devices 818. The input devices 812 may include, for example, microphones, keyboards, cameras, electronic pens, touch screens, and other devices for receiving inputs including message data, requests, commands, user interface interactions, selections, and other types of input. The output devices 818 may include a speaker, a display device such as a monitor or touch screen, and other devices for presenting an interface to the communications system 800.

The client 810 may include a memory, which may be a non-transitory computer readable storage medium, such as one or a combination of a hard drive, solid state drive, flash storage, read only memory, or random access memory. The memory may a representation of an input 814 and/or a representation of an output 816, as well as one or more applications. For example, the memory may store a messaging client 820 and/or a social networking client that allows a user to interact with a social networking service.

The input 814 may be textual, such as in the case where the input device 812 is a keyboard. Alternatively, the input 814 may be an audio or video recording, such as in the case where the input device 812 is a microphone or camera.

The input 814 may be subjected to automatic speech recognition (ASR) logic in order to transform the audio recording to text that is processable by the messaging system 800. The ASR logic may be located at the client device 810 (so that the audio recording is processed locally by the client 810 and corresponding text is transmitted to the communications server 826), or may be located remotely at the communications server 826 (in which case, the audio recording may be transmitted to the communications server 826 and the communications server 826 may process the audio into text). Other combinations are also possible—for example, if the input device 812 is a touch pad or electronic pen, the input 814 may be in the form of handwriting, which may be subjected to handwriting or optical character recognition analysis logic in order to transform the input 812 into processable text.

The client 810 may be provided with a network interface 822 for communicating with a network 824, such as the Internet. The network interface 822 may transmit the input 812 in a format and/or using a protocol compatible with the network 824 and may receive a corresponding output 816 from the network 824.

The network interface 822 may communicate through the network 824 to a messaging server 826. The messaging server 826 may be operative to receive, store, and forward messages between messaging clients.

The communications server 826 may include a network interface 822, communications preferences 828, and communications logic 830. The communications preferences 828 may include one or more privacy settings for one or more users and/or video communications. For example, the communications preferences 828 may include one or more settings, including default settings, for the logic described herein.

The communications logic 830 may include relevant participant logic 832 for identifying a dominant and/or relevant participant, as described above. The communications logic 830 may further include interface logic 834 for displaying a reduced-size interface, as further described above (the interface logic 834 may also or alternatively be provided on the clients 810).

The network interface 822 of the client 810 and/or the communications server 826 may also be used to communicate through the network 824 with a social networking server 836. The social networking server 836 may include or may interact with a social networking graph 838 that defines connections in a social network. Furthermore, the communications server 826 may connect to the social networking server 836 for various purposes, such as retrieving connection information, messaging history, event details, etc. from the social network.

A user of the client 810 may be an individual (human user), an entity (e.g., an enterprise, business, or third-party application), or a group (e.g., of individuals or entities) that interacts or communicates with or over the social networking server 836. The social-networking server 836 may be a network-addressable computing system hosting an online social network. The social networking server 836 may generate, store, receive, and send social-networking data, such as, for example, user-profile data, concept-profile data, social-graph information, or other suitable data related to the online social network. The social networking server 836 may be accessed by the other components of the network environment either directly or via the network 824.

The social networking server 836 may include an authorization server (or other suitable component(s)) that allows users to opt in to or opt out of having their actions logged by social-networking server 836 or shared with other systems (e.g., third-party systems, such as the messaging server 826), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking server 836 through blocking, data hashing, anonymization, or other suitable techniques as appropriate.

More specifically, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums).

In particular embodiments, privacy settings may be associated with particular elements of the social networking graph 838. Privacy settings of a social-graph element, such as a node or an edge, may specify how the social-graph element, information associated with the social-graph element, or content objects associated with the social-graph element can be accessed using the online social network. As an example and not by way of limitation, a particular concept node corresponding to a particular photo may have a privacy setting specifying that the photo may only be accessed by users tagged in the photo and their friends. In particular embodiments, privacy settings may allow users to opt in or opt out of having their actions logged by social networking server 836 or shared with other systems. In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In response to a request from a user (or other entity) for a particular object stored in a data store, the social networking server 836 may send a request to the data store for the object. The request may identify the user associated with the request. The requested data object may only be sent to the user (or a client system 810 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results.

In some embodiments, targeting criteria may be used to identify users of the social network for various purposes. Targeting criteria used to identify and target users may include explicit, stated user interests on social-networking server 836 or explicit connections of a user to a node, object, entity, brand, or page on social networking server 836. In addition, or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also implicate privacy settings (such as user opt-outs), data hashing, or data anonymization, as appropriate.

The centralized embodiment depicted in FIG. 8A may be well-suited to deployment as a new system or as an upgrade to an existing system, because the logic is incorporated into the messaging server 826. In contrast, FIG. 8B depicts an exemplary distributed messaging system 850, in which functionality for selecting dominant/relevant participants and displaying a reduced-size interface is distributed and remotely accessible from the messaging server. Examples of a distributed system 850 include a client-server architecture, a 3-tier architecture, an N-tier architecture, a tightly-coupled or clustered architecture, a peer-to-peer architecture, a master-slave architecture, a shared database architecture, and other types of distributed systems.

Many of the components depicted in FIG. 8B are identical to those in FIG. 8A, and a description of these elements is not repeated here for the sake of brevity. The primary difference between the centralized embodiment and the distributed embodiment is the addition of a separate communication server 852, which hosts the relevant participant logic 832 and the interface logic 834. The communication server 852 may be distinct from the communications server 826 but may communicate with the communications server 826, either directly or through the network 824, to provide the functionality of the interface logic 834 and the relevant participant logic 832 to the messaging server 826.

The embodiment depicted in FIG. 8B may be particularly well suited to allow exemplary embodiments to be deployed alongside existing messaging systems, for example when it is difficult or undesirable to replace an existing messaging server. Additionally, in some cases the communications server 826 may have limited resources (e.g. processing or memory resources) that limit or preclude the addition of the additional pivot functionality. In such situations, the capabilities described herein may still be provided through the separate communications server 852.

FIG. 8C illustrates an example of a social networking graph 838. In exemplary embodiments, a social networking service may store one or more social graphs 838 in one or more data stores as a social graph data structure via the social networking service.

The social graph 838 may include multiple nodes, such as user nodes 854 and concept nodes 856. The social graph 838 may furthermore include edges 858 connecting the nodes. The nodes and edges of social graph 838 may be stored as data objects, for example, in a data store (such as a social-graph database). Such a data store may include one or more searchable or queryable indexes of nodes or edges of social graph 838.

The social graph 838 may be accessed by a social-networking server 826, client system 810, third-party system, or any other approved system or device for suitable applications.

A user node 854 may correspond to a user of the social-networking system. A user may be an individual (human user), an entity (e.g., an enterprise, business, or third-party application), or a group (e.g., of individuals or entities) that interacts or communicates with or over the social-networking system. In exemplary embodiments, when a user registers for an account with the social-networking system, the social-networking system may create a user node 854 corresponding to the user, and store the user node 854 in one or more data stores. Users and user nodes 854 described herein may, where appropriate, refer to registered users and user nodes 854 associated with registered users. In addition or as an alternative, users and user nodes 854 described herein may, where appropriate, refer to users that have not registered with the social-networking system. In particular embodiments, a user node 854 may be associated with information provided by a user or information gathered by various systems, including the social-networking system. As an example and not by way of limitation, a user may provide their name, profile picture, contact information, birth date, sex, marital status, family status, employment, education background, preferences, interests, or other demographic information. In particular embodiments, a user node 854 may be associated with one or more data objects corresponding to information associated with a user. In particular embodiments, a user node 854 may correspond to one or more webpages. A user node 854 may be associated with a unique user identifier for the user in the social-networking system.

In particular embodiments, a concept node 856 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 556 may be associated with information of a concept provided by a user or information gathered by various systems, including the social-networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 856 may be associated with one or more data objects corresponding to information associated with concept node 856. In particular embodiments, a concept node 856 may correspond to one or more webpages.

In particular embodiments, a node in social graph 838 may represent or be represented by a webpage (which may be referred to as a "profile page"). Profile pages may be hosted by or accessible to the social-networking system. Profile pages may also be hosted on third-party websites associated with a third-party server. As an example and not by way of limitation, a profile page corresponding to a particular external webpage may be the particular external webpage and the profile page may correspond to a particular concept node 856. Profile pages may be viewable by all or a selected subset of other users. As an example and not by way of limitation, a user node 854 may have a corresponding user-profile page in which the corresponding user may add content, make declarations, or otherwise express himself or herself. A business page may comprise a user-profile page for a commerce entity. As another example and not by way of limitation, a concept node 856 may have a corresponding concept-profile page in which one or more users may add content, make declarations, or express themselves, particularly in relation to the concept corresponding to concept node 856.

In particular embodiments, a concept node 856 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system a message indicating the user's action. In response to the message, the social-networking system may create an edge (e.g., an "eat" edge) between a user node 854 corresponding to the user and a concept node 856 corresponding to the third-party webpage or resource and store edge 858 in one or more data stores.

In particular embodiments, a pair of nodes in social graph 838 may be connected to each other by one or more edges 858. An edge 858 connecting a pair of nodes may represent a relationship between the pair of nodes. In particular embodiments, an edge 858 may include or represent one or more data objects or attributes corresponding to the relationship between a pair of nodes. As an example and not by way of limitation, a first user may indicate that a second user is a "friend" of the first user. In response to this indication, the social-networking system may send a "friend request" to the second user. If the second user confirms the "friend request," the social-networking system may create an edge 858 connecting the first user's user node 854 to the second user's user node 854 in social graph 838 and store edge 858 as social-graph information in one or more data stores. In the example of FIG. 8C, social graph 838 includes an edge 858 indicating a friend relation between user nodes 854 of user "Amanda" and user "Dorothy." Although this disclosure describes or illustrates particular edges 858 with particular attributes connecting particular user nodes 854, this disclosure contemplates any suitable edges 858 with any suitable attributes connecting user nodes 854. As an example and not by way of limitation, an edge 858 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 838 by one or more edges 858.

In particular embodiments, an edge 858 between a user node 854 and a concept node 856 may represent a particular action or activity performed by a user associated with user node 854 toward a concept associated with a concept node 856. As an example and not by way of limitation, as illustrated in FIG. 8C, a user may "like," "attended," "played," "listened," "cooked," "worked at," or "watched" a concept, each of which may correspond to an edge type or subtype. A concept-profile page corresponding to a concept node 856 may include, for example, a selectable "check in" icon (such as, for example, a clickable "check in" icon) or a selectable "add to favorites" icon. Similarly, after a user clicks these icons, the social-networking system may create a "favorite" edge or a "check in" edge in response to a user's action corresponding to a respective action. As another example and not by way of limitation, a user (user "Carla") may listen to a particular song ("Across the Sea") using a particular application (SPOTIFY, which is an online music application). In this case, the social-networking system may create a "listened" edge 858 and a "used" edge (as illustrated in FIG. 8C) between user nodes 854 corresponding to the user and concept nodes 856 corresponding to the song and application to indicate that the user listened to the song and used the application. Moreover, the social-networking system may create a "played" edge 858 (as illustrated in FIG. 8C) between concept nodes 856 corresponding to the song and the application to indicate that the particular song was played by the particular application. In this case, "played" edge 858 corresponds to an action performed by an external application (SPOTIFY) on an external audio file (the song "Across the Sea"). Although this disclosure describes particular edges 858 with particular attributes connecting user nodes 854 and concept nodes 856, this disclosure contemplates any suitable edges 858 with any suitable attributes connecting user nodes 854 and concept nodes 856. Moreover, although this disclosure describes edges between a user node 854 and a concept node 856 representing a single relationship, this disclosure contemplates edges between a user node 854 and a concept node 856 representing one or more relationships. As an example and not by way of limitation, an edge 858 may represent both that a user likes and has used at a particular concept. Alternatively, another edge 858 may represent each type of relationship (or multiples of a single relationship) between a user node 854 and a concept node 856 (as illustrated in FIG. 8C between user node 854 for user "Edwin" and concept node 856 for "SPOTIFY").

In particular embodiments, the social-networking system may create an edge 858 between a user node 854 and a concept node 856 in social graph 838. As an example and not by way of limitation, a user viewing a concept-profile page (such as, for example, by using a web browser or a special-purpose application hosted by the user's client system) may indicate that he or she likes the concept represented by the concept node 856 by clicking or selecting a "Like" icon, which may cause the user's client system to send to the social-networking system a message indicating the user's liking of the concept associated with the concept-profile page. In response to the message, the social-networking system may create an edge 858 between user node 854 associated with the user and concept node 856, as illustrated by "like" edge 858 between the user and concept node 856. In particular embodiments, the social-networking system may store an edge 858 in one or more data stores. In particular embodiments, an edge 858 may be automatically formed by the social-networking system in response to a particular user action. As an example and not by way of limitation, if a first user uploads a picture, watches a movie, or listens to a song, an edge 858 may be formed between user node 854 corresponding to the first user and concept nodes 856 corresponding to those concepts. Although this disclosure describes forming particular edges 858 in particular manners, this disclosure contemplates forming any suitable edges 858 in any suitable manner.

The social graph 838 may further comprise a plurality of product nodes. Product nodes may represent particular products that may be associated with a particular business. A business may provide a product catalog to a consumer-to-business service and the consumer-to-business service may therefore represent each of the products within the product in the social graph 838 with each product being in a distinct product node. A product node may comprise information relating to the product, such as pricing information, descriptive information, manufacturer information, availability information, and other relevant information. For example, each of the items on a menu for a restaurant may be represented within the social graph 838 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 838. The information for a product node may be manipulated by the social-networking system as a product object that encapsulates information regarding the referenced product.

As such, the social graph 838 may be used to infer shared interests, shared experiences, or other shared or common attributes of two or more users of a social-networking system. For instance, two or more users each having an edge to a common business, product, media item, institution, or other entity represented in the social graph 838 may indicate a shared relationship with that entity, which may be used to suggest customization of a use of a social-networking system, including a messaging system, for one or more users.

The embodiments described above may be performed by a messaging architecture, an example of which is next described with reference to FIG. 9.

Messaging Architecture

Figure 9:
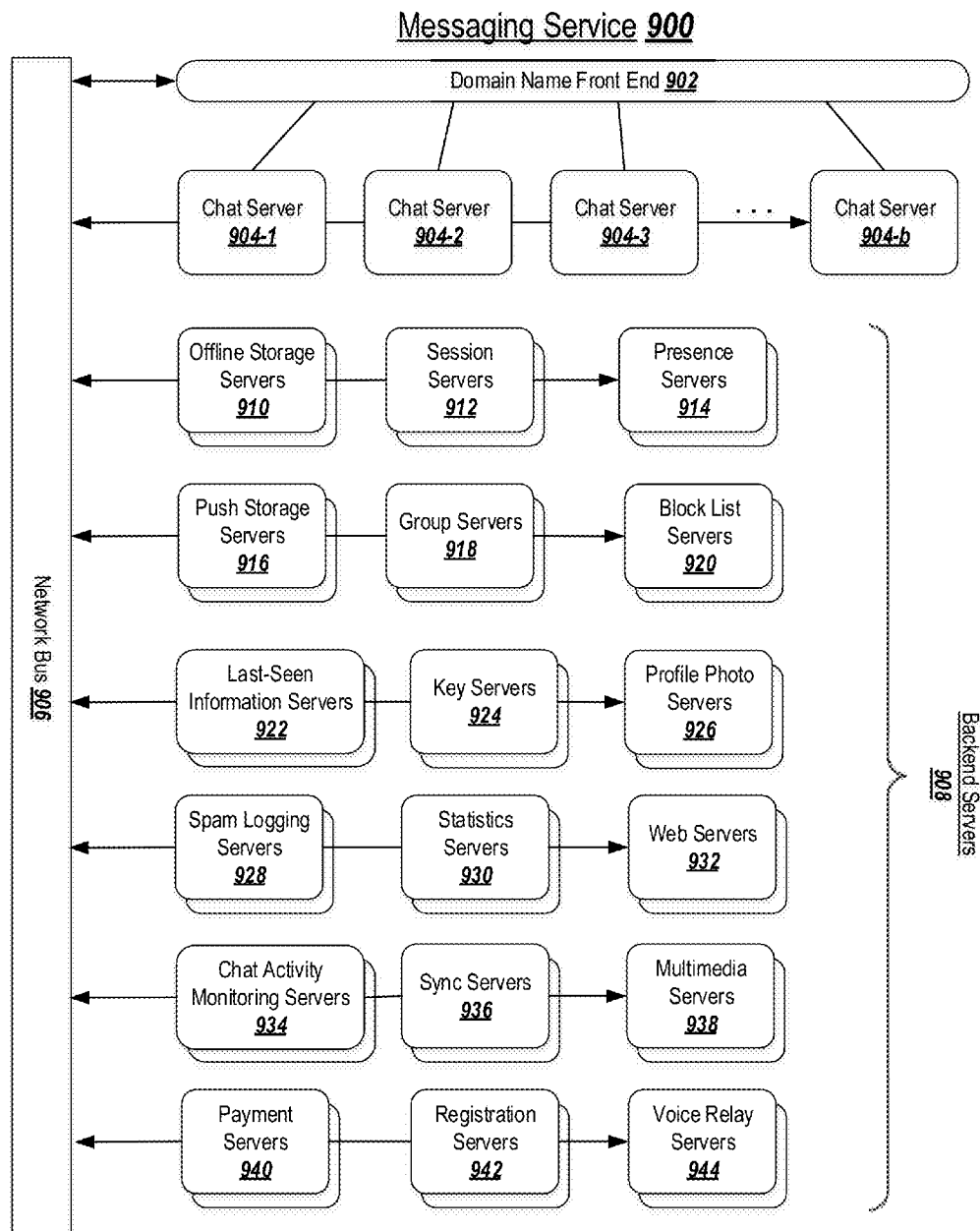
FIG. 9 is a block diagram depicting an example of a system for a messaging service.

FIG. 9 illustrates an embodiment of a plurality of servers implementing various functions of a messaging service 900. It will be appreciated that different distributions of work and functions may be used in various embodiments of a messaging service 900.

The messaging service 900 may comprise a domain name front end 902. The domain name front end 902 may be assigned one or more domain names associated with the messaging service 900 in a domain name system (DNS). The domain name front end 902 may receive incoming connections and distribute the connections to servers providing various messaging services.

The messaging service 902 may comprise one or more chat servers 904. The chat servers 904 may comprise front-end servers for receiving and transmitting user-to-user messaging updates such as chat messages. Incoming connections may be assigned to the chat servers 904 by the domain name front end 902 based on workload balancing.

The messaging service 900 may comprise backend servers 908. The backend servers 908 may perform specialized tasks in the support of the chat operations of the front-end chat servers 904. A plurality of different types of backend servers 908 may be used. It will be appreciated that the assignment of types of tasks to different backend serves 908 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging service 900 may comprise one or more offline storage servers 910. The one or more offline storage servers 910 may store messaging content for currently-offline messaging clients in hold for when the messaging clients reconnect.

The messaging service 900 may comprise one or more sessions servers 912. The one or more session servers 912 may maintain session state of connected messaging clients.

The messaging service 900 may comprise one or more presence servers 914. The one or more presence servers 914 may maintain presence information for the messaging service 900. Presence information may correspond to user-specific information indicating whether or not a given user has an online messaging client and is available for chatting, has an online messaging client but is currently away from it, does not have an online messaging client, and any other presence state.

The messaging service 900 may comprise one or more push storage servers 916. The one or more push storage servers 916 may cache push requests and transmit the push requests to messaging clients. Push requests may be used to wake messaging clients, to notify messaging clients that a messaging update is available, and to otherwise perform server-side-driven interactions with messaging clients.

The messaging service 900 may comprise one or more group servers 918. The one or more group servers 918 may maintain lists of groups, add users to groups, remove users from groups, and perform the reception, caching, and forwarding of group chat messages.

The messaging service 900 may comprise one or more block list servers 920. The one or more block list servers 920 may maintain user-specific block lists, the user-specific incoming-block lists indicating for each user the one or more other users that are forbidden from transmitting messages to that user. Alternatively or additionally, the one or more block list servers 920 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging service 900 may comprise one or more last seen information servers 922. The one or more last seen information servers 922 may receive, store, and maintain information indicating the last seen location, status, messaging client, and other elements of a user's last seen connection to the messaging service 900.

The messaging service 900 may comprise one or more key servers 924. The one or more key servers may host public keys for public/private key encrypted communication.

The messaging service 900 may comprise one or more profile photo servers 926. The one or more profile photo servers 926 may store and make available for retrieval profile photos for the plurality of users of the messaging service 900.

The messaging service 900 may comprise one or more spam logging servers 928. The one or more spam logging servers 928 may log known and suspected spam (e.g., unwanted messages, particularly those of a promotional nature). The one or more spam logging servers 928 may be operative to analyze messages to determine whether they are spam and to perform punitive measures, in some embodiments, against suspected spammers (users that send spam messages).

The messaging service 900 may comprise one or more statistics servers 930. The one or more statistics servers may compile and store statistics information related to the operation of the messaging service 900 and the behavior of the users of the messaging service 900.

The messaging service 900 may comprise one or more web servers 932. The one or more web servers 932 may engage in hypertext transport protocol (HTTP) and hypertext transport protocol secure (HTTPS) connections with web browsers.

The messaging service 900 may comprise one or more chat activity monitoring servers 934. The one or more chat activity monitoring servers 934 may monitor the chats of users to determine unauthorized or discouraged behavior by the users of the messaging service 900. The one or more chat activity monitoring servers 934 may work in cooperation with the spam logging servers 928 and block list servers 920, with the one or more chat activity monitoring servers 934 identifying spam or other discouraged behavior and providing spam information to the spam logging servers 928 and blocking information, where appropriate to the block list servers 920.

The messaging service 900 may comprise one or more sync servers 936. The one or more sync servers 936 may sync the messaging system 500 with contact information from a messaging client, such as an address book on a mobile phone, to determine contacts for a user in the messaging service 900.

The messaging service 900 may comprise one or more multimedia servers 938. The one or more multimedia servers may store multimedia (e.g., images, video, audio) in transit between messaging clients, multimedia cached for offline endpoints, and may perform transcoding of multimedia.

The messaging service 900 may comprise one or more payment servers 940. The one or more payment servers 940 may process payments from users. The one or more payment servers 940 may connect to external third-party servers for the performance of payments.

The messaging service 900 may comprise one or more registration servers 942. The one or more registration servers 942 may register new users of the messaging service 900.

The messaging service 900 may comprise one or more voice relay servers 944. The one or more voice relay servers 944 may relay voice-over-internet-protocol (VoIP) voice communication between messaging clients for the performance of VoIP calls.

Figure 10:
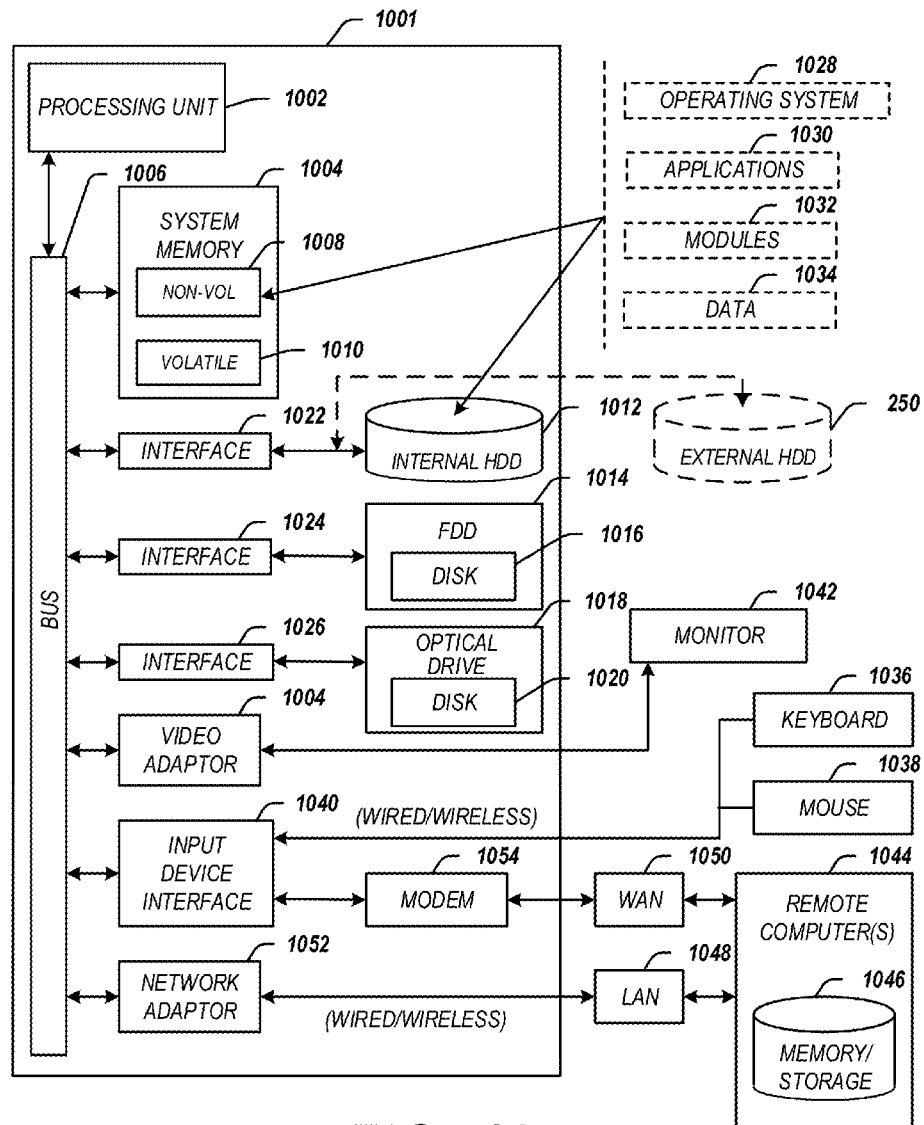
FIG. 10 is a block diagram illustrating an exemplary computing device suitable for use with exemplary embodiments.

The above-described methods may be embodied as instructions on a computer readable medium or as part of a computing architecture. FIG. 10 illustrates an embodiment of an exemplary computing architecture 1000 suitable for implementing various embodiments as previously described. In one embodiment, the computing architecture 1000 may comprise or be implemented as part of an electronic device, such as a computer 1001. The embodiments are not limited in this context.

As used in this application, the terms "system" and "component" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1002, a system memory 1004 and a system bus 1006. The processing unit 1002 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1002.

The system bus 1006 provides an interface for system components including, but not limited to, the system memory 1004 to the processing unit 1002. The system bus 1006 can be any of several types of bus structure that may further interconnect to a memory bus (with or without a memory controller), a peripheral bus, and a local bus using any of a variety of commercially available bus architectures. Interface adapters may connect to the system bus 1006 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1000 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1004 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1004 can include non-volatile memory 1008 and/or volatile memory 1010. A basic input/output system (BIOS) can be stored in the non-volatile memory 1008.

The computing architecture 1000 may include various types of computer-readable storage media in the form of one or more lower speed memory units, including an internal (or external) hard disk drive (HDD) 1012, a magnetic floppy disk drive (FDD) 1014 to read from or write to a removable magnetic disk 1016, and an optical disk drive 1018 to read from or write to a removable optical disk 1020 (e.g., a CD-ROM or DVD). The HDD 1012, FDD 1014 and optical disk drive 1020 can be connected to the system bus 1006 by an HDD interface 1022, an FDD interface 1024 and an optical drive interface 1026, respectively. The HDD interface 1022 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 1008, 1012, including an operating system 1028, one or more application programs 1030, other program modules 1032, and program data 1034. In one embodiment, the one or more application programs 1030, other program modules 1032, and program data 1034 can include, for example, the various applications and/or components of the messaging system 500.

A user can enter commands and information into the computer 1001 through one or more wire/wireless input devices, for example, a keyboard 1036 and a pointing device, such as a mouse 1038. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1002 through an input device interface 1040 that is coupled to the system bus 1006, but can be connected by other interfaces such as a parallel port, IEEE 694 serial port, a game port, a USB port, an IR interface, and so forth.

A monitor 1042 or other type of display device is also connected to the system bus 1006 via an interface, such as a video adaptor 1044. The monitor 1042 may be internal or external to the computer 1001. In addition to the monitor 1042, a computer typically includes other peripheral output devices, such as speakers, printers, and so forth.

The computer 1001 may operate in a networked environment using logical connections via wire and/or wireless communications to one or more remote computers, such as a remote computer 1044. The remote computer 1044 can be a workstation, a server computer, a router, a personal computer, portable computer, microprocessor-based entertainment appliance, a peer device or other common network node, and typically includes many or all of the elements described relative to the computer 1001, although, for purposes of brevity, only a memory/storage device 1046 is illustrated. The logical connections depicted include wire/wireless connectivity to a local area network (LAN) 1048 and/or larger networks, for example, a wide area network (WAN) 1050. Such LAN and WAN networking environments are commonplace in offices and companies, and facilitate enterprise-wide computer networks, such as intranets, all of which may connect to a global communications network, for example, the Internet.

When used in a LAN networking environment, the computer 1001 is connected to the LAN 1048 through a wire and/or wireless communication network interface or adaptor 1052. The adaptor 1052 can facilitate wire and/or wireless communications to the LAN 1048, which may also include a wireless access point disposed thereon for communicating with the wireless functionality of the adaptor 1052.

When used in a WAN networking environment, the computer 1001 can include a modem 1054, or is connected to a communications server on the WAN 1050, or has other means for establishing communications over the WAN 1050, such as by way of the Internet. The modem 1054, which can be internal or external and a wire and/or wireless device, connects to the system bus 1006 via the input device interface 1040. In a networked environment, program modules depicted relative to the computer 1001, or portions thereof, can be stored in the remote memory/storage device 1046. It will be appreciated that the network connections shown are exemplary and other means of establishing a communications link between the computers can be used.

The computer 1001 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 11:
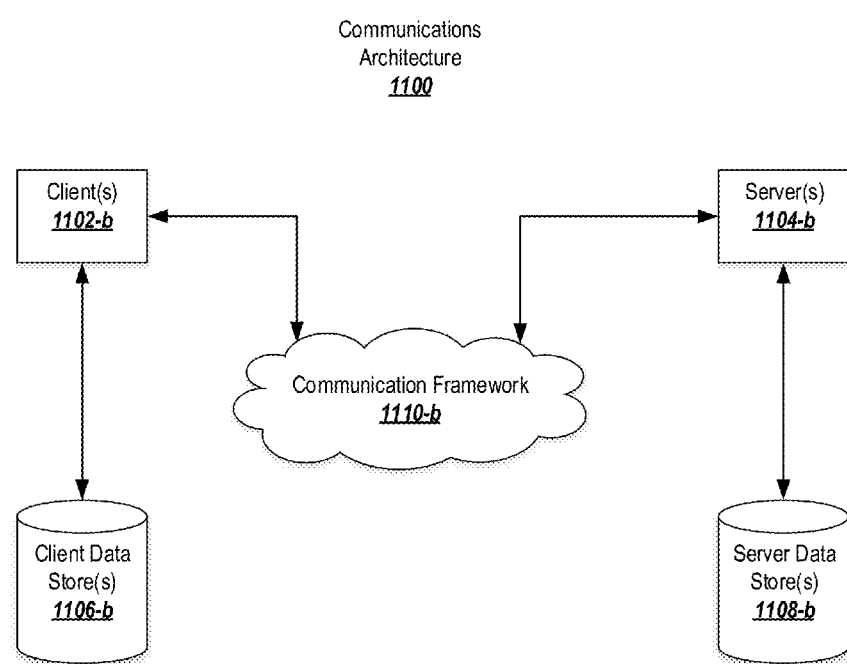
FIG. 11 depicts an exemplary communication architecture.

FIG. 11 is a block diagram depicting an exemplary communications architecture 1100 suitable for implementing various embodiments as previously described. The communications architecture 1100 includes various common communications elements, such as a transmitter, receiver, transceiver, radio, network interface, baseband processor, antenna, amplifiers, filters, power supplies, and so forth. The embodiments, however, are not limited to implementation by the communications architecture 1100.

As shown in FIG. 11, the communications architecture 1100 includes one or more clients 1102 and servers 1104. The clients 1102 may implement the client device 510. The servers 1104 may implement the server device 526. The clients 1102 and the servers 1104 are operatively connected to one or more respective client data stores 1106 and server data stores 1108 that can be employed to store information local to the respective clients 1102 and servers 1104, such as cookies and/or associated contextual information.

The clients 1102 and the servers 1104 may communicate information between each other using a communication framework 1110. The communications framework 1110 may implement any well-known communications techniques and protocols. The communications framework 1110 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1110 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1102 and the servers 1104. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 12:
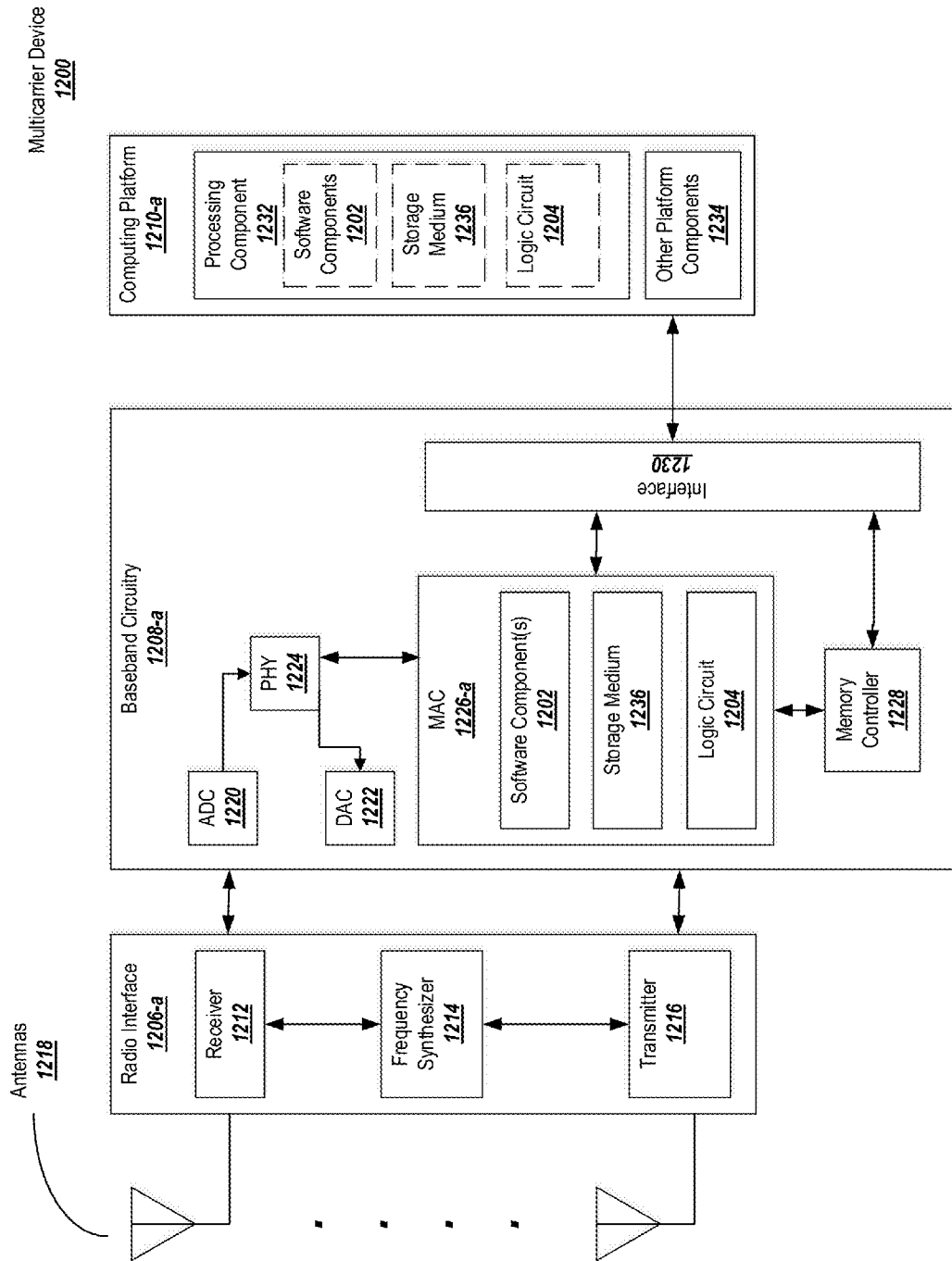
FIG. 12 is a block diagram depicting an exemplary multicarrier communications device.

FIG. 12 illustrates an embodiment of a device 1200 for use in a multicarrier OFDM system, such as the messaging system 500. The device 1200 may implement, for example, software components 1202 as described with reference to the messaging component logic 600, the intent determination logic 700, and the group selection logic 800. The device 1200 may also implement a logic circuit 1204. The logic circuit 1204 may include physical circuits to perform operations described for the messaging system 500. As shown in FIG. 12, device 1200 may include a radio interface 1206, baseband circuitry 1208, and a computing platform 1210, although embodiments are not limited to this configuration.

The device 1200 may implement some or all of the structure and/or operations for the messaging system 500 and/or logic circuit 1204 in a single computing entity, such as entirely within a single device. Alternatively, the device 1200 may distribute portions of the structure and/or operations for the messaging system 500 and/or logic circuit 1204 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, the radio interface 1206 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. The radio interface 1206 may include, for example, a receiver 1212, a transmitter 1214 and/or a frequency synthesizer 1216. The radio interface 1206 may include bias controls, a crystal oscillator and/or one or more antennas 1218. In another embodiment, the radio interface 1206 may use external voltage-controlled oscillators (VCOs), surface acoustic wave filters, intermediate frequency (IF) filters and/or RF filters, as desired. Due to the variety of potential RF interface designs an expansive description thereof is omitted.

The baseband circuitry 1208 may communicate with the radio interface 1206 to process receive and/or transmit signals and may include, for example, an analog-to-digital converter 1220 for down converting received signals, and a digital-to-analog converter 1222 for up-converting signals for transmission. Further, the baseband circuitry 1208 may include a baseband or physical layer (PHY) processing circuit 1224 for PHY link layer processing of respective receive/transmit signals. The baseband circuitry 1208 may include, for example, a processing circuit 1226 for medium access control (MAC)/data link layer processing. The baseband circuitry 1208 may include a memory controller 1228 for communicating with the processing circuit 1226 and/or a computing platform 1210, for example, via one or more interfaces 1230.

In some embodiments, the PHY processing circuit 1224 may include a frame construction and/or detection module, in combination with additional circuitry such as a buffer memory, to construct and/or deconstruct communication frames, such as radio frames. Alternatively or in addition, the MAC processing circuit 1226 may share processing for certain of these functions or perform these processes independent of the PHY processing circuit 1224. In some embodiments, MAC and PHY processing may be integrated into a single circuit.

The computing platform 1210 may provide computing functionality for the device 1200. As shown, the computing platform 1210 may include a processing component 1232. In addition to, or alternatively of, the baseband circuitry 1208, the device 1200 may execute processing operations or logic for the messaging system 500 and logic circuit 1204 using the processing component 1232. The processing component 1232 (and/or the PHY 1224 and/or MAC 1226) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1210 may further include other platform components 1234. Other platform components 1234 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

The device 1200 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of the device 1200 described herein, may be included or omitted in various embodiments of the device 1200, as suitably desired. In some embodiments, the device 1200 may be configured to be compatible with protocols and frequencies associated one or more of the 3GPP LTE Specifications and/or IEEE 1402.16 Standards for WMANs, and/or other broadband wireless networks, cited herein, although the embodiments are not limited in this respect.

Embodiments of device 1200 may be implemented using single input single output (SISO) architectures. However, certain implementations may include multiple antennas (e.g., antennas 1218) for transmission and/or reception using adaptive antenna techniques for beamforming or spatial division multiple access (SDMA) and/or using MIMO communication techniques.

The components and features of the device 1200 may be implemented using any combination of discrete circuitry, application specific integrated circuits (ASICs), logic gates and/or single chip architectures. Further, the features of the device 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary device 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium 1236 may include instructions that, when executed, cause a system to perform any of the computer-implemented methods described herein.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method, comprising:
displaying a full-sized interface for a video call on a display associated with a participant in the video call, wherein the display is a touch interface;
displaying a reduced-size interface for the video call on a portion of the display associated with the first participant in the video call, the portion being smaller than an entirety of the display, the interface comprising a main window displaying a current relevant video communication in the video call and a roster of additional participants in the video call;
registering a haptic contact initiation signal at a first location on the display in the portion of the display comprising the interface;
registering a haptic contact release signal at a second location on the display; and
moving the interface for the video call based on a difference between the first location and the second location;
receiving an instruction to display a second video communication associated with a second participant that is identified as a previous relevant video communication in the video call while a first video communication associated with the first participant is flagged as the current relevant video communication; and
displaying the second video communication in the main window of the interface.

2. The method of claim 1, wherein the displaying the interface on the portion of the display comprises playing an animation to shrink the full-sized interface into the reduced-size interface on the portion of the display.

3. The method of claim 1, wherein the interface further comprises a roster of participants in the video call, wherein the roster exhibits reduced functionality as compared to a full-sized interface for the video call.

4. The method of claim 1, wherein the first participant is a dominant speaker as compared to the second participant.

5. The method of claim 1, wherein the second participant is a dominant speaker as compared to the first participant, and a relevancy metric for the first participant causes the second participant to be overridden as a current relevant participant.

6. The method of claim 1, wherein the first participant is associated with a media effect at a time when the first participant is considered a current relevant participant.

7. A non-transitory computer-readable medium storing instructions configured to cause one or more processors to:
display a full-sized interface for a video call on a display associated with a first participant in the video call;
display a reduced-size interface for the video call on a portion of the display associated with the first participant in the video call, the portion being smaller than an entirety of the display, the interface comprising a main window displaying a current relevant video communication in the video call and a roster of additional participants in the video call, wherein displaying the interface on the portion of the display comprises playing an animation to shrink the full-sized interface into the reduced-size interface on the portion of the display;
receive an instruction to display a second video communication associated with a second participant that is identified as a previous relevant video communication in the video call while a first video communication associated with the first participant is flagged as the current relevant video communication; and
display the second video communication in the main window of the interface.

8. The medium of claim 7, wherein the display is a touch interface and further storing instructions for:
registering a haptic contact initiation signal at a first location on the display in the portion of the display comprising the interface;
registering a haptic contact release signal at a second location on the display; and
moving the interface for the video call based on a difference between the first location and the second location.

9. The medium of claim 7, wherein the interface further comprises a roster of participants in the video call, wherein the roster exhibits reduced functionality as compared to a full-sized interface for the video call.

10. The medium of claim 7, wherein the first participant is a dominant speaker as compared to the second participant.

11. The medium of claim 7, wherein the second participant is a dominant speaker as compared to the first participant, and a relevancy metric for the first participant causes the second participant to be overridden as a current relevant participant.

12. The medium of claim 7, wherein the first participant is associated with a media effect at a time when the first participant is considered a current relevant participant.

13. An apparatus comprising:
a non-transitory computer readable medium configured to store instructions for facilitating a video call; and
a processor configured to execute the instructions, the instructions configured to cause the processor to:
display a full-sized interface for the video call on a display associated with a first participant in the video call;
display a reduced-size interface for the video call on a portion of the display associated with the first participant in the video call, the portion being smaller than an entirety of the display, the interface comprising a main window displaying a current relevant video communication in the video call and a roster of additional participants in the video call;
receive an instruction to display a second video communication associated with a second participant that is identified as a previous relevant video communication in the video call while a first video communication associated with the first participant is flagged as the current relevant video communication, wherein the second participant is a dominant speaker as compared to the first participant, and a relevancy metric for the first participant causes the second participant to be overridden as a current relevant participant; and display the second video communication in the main window of the interface.

14. The apparatus of claim 13, wherein the display is a touch interface and instructions are further configured to cause the processor to:
   register a haptic contact initiation signal at a first location on the display in the portion of the display comprising the interface;
   register a haptic contact release signal at a second location on the display; and
   move the interface for the video call based on a difference between the first location and the second location.

15. The apparatus of claim 13, wherein the displaying the interface on the portion of the display comprises playing an animation to shrink the full-sized interface into the interface on the portion of the display.

16. The apparatus of claim 13, wherein the interface further comprises a roster of participants in the video call, wherein the roster exhibits reduced functionality as compared to a full-sized interface for the video call.

17. The apparatus of claim 13, wherein the first participant is a dominant speaker as compared to the second participant.

* * * * *